United States Patent
Chang et al.

(10) Patent No.: US 10,996,743 B2
(45) Date of Patent: May 4, 2021

(54) ELECTRONIC SYSTEM AND CONTROLLER AND THE OPERATING METHOD FOR THE SAME

(71) Applicant: HTC Corporation, Taoyuan (TW)

(72) Inventors: Li-Hsun Chang, Taoyuan (TW); Tian-Jia Hsieh, Taoyuan (TW); Kuan-Ying Ou, Taoyuan (TW); Hsi-Yu Tseng, Taoyuan (TW); Chen-Fu Chang, Taoyuan (TW); Huan-Hsin Li, Taoyuan (TW); Chien-Min Wu, Taoyuan (TW); Tzu-Hao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/731,029

(22) Filed: Dec. 31, 2019

(65) Prior Publication Data

US 2020/0218336 A1    Jul. 9, 2020

Related U.S. Application Data

(60) Provisional application No. 62/790,019, filed on Jan. 9, 2019, provisional application No. 62/787,761, filed on Jan. 3, 2019.

(51) Int. Cl.
*G06F 3/046* (2006.01)
*G06F 3/01* (2006.01)

(52) U.S. Cl.
CPC .............. *G06F 3/011* (2013.01); *G06F 3/017* (2013.01)

(58) Field of Classification Search
CPC .......... G06F 3/011; G06F 3/014; G06F 3/017; G06F 3/0304; G06F 3/0308;
(Continued)

(56) References Cited

U.S. PATENT DOCUMENTS

| 9,244,562 B1 * | 1/2016 | Rosenberg ............ G06F 3/0414 |
| 10,065,111 B1 * | 9/2018 | Patel ..................... A63F 13/214 |

(Continued)

FOREIGN PATENT DOCUMENTS

TW    201519005    5/2015

OTHER PUBLICATIONS

"Office Action of Taiwan Counterpart Application", dated Sep. 18, 2020, p. 1-p. 7.

Primary Examiner — Michael J Eurice
(74) Attorney, Agent, or Firm — JCIPRNET

(57) ABSTRACT

A computer-implement operating method includes periodically generating sensing data by determining a triggered area of each of the sensors of a surface on which each of the sensors disposed; grouping effective sensors among the sensors into a plurality of sensor groups respectively corresponding to the fingers; obtaining a bending angle of one finger among the fingers according to the sensing values of the sensing data of all effective sensors in one sensor group corresponding to the said one finger among the sensor groups; and bending one virtual finger corresponding to the said one finger among virtual fingers of a virtual hand rendered in a virtual space corresponding to the electronic system according to the obtained bending angle of the said one finger, so as to render the virtual hand having a gesture matching to a gesture of the hand sensed by the controller.

20 Claims, 29 Drawing Sheets

(58) Field of Classification Search
CPC .... G06F 3/0346; G06F 3/04166; G06F 3/042; G06F 2203/0331; G06F 2203/0339; G06F 2203/04101; A63F 13/211; A63F 13/24; A63F 2300/1012
See application file for complete search history.

(56) References Cited

U.S. PATENT DOCUMENTS

| | | | | |
|---|---|---|---|---|
| 2012/0113223 | A1* | 5/2012 | Hilliges | G06F 3/00 348/46 |
| 2012/0114255 | A1* | 5/2012 | Kimura | G06F 3/017 382/203 |
| 2013/0265220 | A1* | 10/2013 | Fleischmann | G06F 3/011 345/156 |
| 2014/0204018 | A1* | 7/2014 | Murase | G06F 3/0426 345/156 |
| 2015/0161437 | A1* | 6/2015 | Mazurenko | G06K 9/00389 382/103 |
| 2015/0242101 | A1* | 8/2015 | Ishino | G06T 7/75 715/776 |
| 2015/0258431 | A1* | 9/2015 | Stafford | A63F 13/211 463/31 |
| 2015/0258432 | A1* | 9/2015 | Stafford | A63F 13/5255 463/32 |
| 2016/0054798 | A1* | 2/2016 | Messingher | G02B 27/0093 345/156 |
| 2016/0246369 | A1* | 8/2016 | Osman | G06F 3/0346 |
| 2016/0246370 | A1* | 8/2016 | Osman | G06T 19/006 |
| 2018/0104576 | A1* | 4/2018 | Hope | A63F 13/24 |
| 2018/0264357 | A1* | 9/2018 | Dalton | A63F 13/24 |
| 2018/0361234 | A1* | 12/2018 | Nietfeld | A63F 13/21 |
| 2019/0064933 | A1* | 2/2019 | Robinson | H03K 17/97 |
| 2019/0102927 | A1* | 4/2019 | Yokokawa | G06T 13/40 |
| 2019/0138107 | A1* | 5/2019 | Nietfeld | G06F 3/017 |
| 2019/0310713 | A1* | 10/2019 | Wang | G06F 3/017 |

* cited by examiner

Controller for right hand

Spherical Controller

T610

| Predetermined feature value | Predetermined bending angle |
|---|---|
| 510(1)<br>(Feature value lower limit) | 520(1)<br>(Bending angle lower limit) |
| 510(2) | 520(2) |
| ⋮ | ⋮ |
| 510(Y)<br>(Feature value upper limit) | 520(Y)<br>(Bending angle upper limit) |

T620

| Predetermined feature value | Predetermined pressure value |
|---|---|
| 510(Y) | 530(Y) |
| 510(Y+1) | 530(Y+1) |
| ⋮ | ⋮ |
| 510(Z) | 530(Z) |

FIG. 6B

```
┌─────────────────────────────────────────────────┐
│ Generating a pulse waveform according to the sensors in the │
│ said one sensor group and the sensing values of the sensors │
│  in the said one sensor group, wherein the pulse waveform   │
│  comprises a plurality of pulses, and the pulses represents │──S710
│  the sensing values of the sensors, wherein an order of the │
│ pulses in the pulse waveform is corresponding to an position│
│                order of the sensors                         │
└─────────────────────────────────────────────────┘
                          ↓
┌─────────────────────────────────────────────────┐
│   Identifying a plurality of predetermined pulse waveforms  │
│ and a plurality of predetermined bending angles respectively│──S720
│      corresponding to the predetermined pulse waveforms     │
└─────────────────────────────────────────────────┘
                          ↓
┌─────────────────────────────────────────────────┐
│    Identifying the bending angle of the said one finger     │
│      according to the generated pulse waveform, the         │──S730
│    predetermined pulse waveforms and the predetermined      │
│                     bending angles                          │
└─────────────────────────────────────────────────┘
```

FIG. 7A

ELECTRONIC SYSTEM AND CONTROLLER AND THE OPERATING METHOD FOR THE SAME

CROSS-REFERENCE TO RELATED APPLICATION

This application claims the priority benefits of U.S. provisional application Ser. No. 62/787,761, filed on Jan. 3, 2019, and U.S. provisional application Ser. No. 62/790,019, filed on Jan. 9, 2019. The entirety of the above-mentioned patent applications is hereby incorporated by reference herein and made a part of this specification.

BACKGROUND

Technical Field

The disclosure relates to a electronic system, and more particularly to a electronic system comprising a controller, a electronic device, and an operating method for the same.

Description of Related Art

Virtual reality (VR), Augmented reality (AR) or Mixed reality (MR) may provide a brand-new experience for the users by letting the user to "live" in a totally virtual world or to perform an interaction with a virtual content rendered in a seen space which mixed with the real-world scene and the virtual content by the computer of the related VR, AR or MR system. Furthermore, the user may use one or more holding physical object (e.g., accessories or controllers) for performing the interaction with a virtual content generated by the related VR/AR/MR system.

However, conventional accessories or controllers of the related VR, AR or MR system cannot accurately detecting/sensing the gesture performed by the fingers of the hand of the user, such that the function or the interaction ability of controller and the related VR/AR/MR system is limited.

SUMMARY

According to an embodiment of the present invention, an electronic system is provided. The electronic system includes a controller operated by a hand of the user and a electronic device. The controller includes a sensing device and a first communication circuit unit, wherein the sensing device includes a plurality of sensors disposed on one or more surfaces of the controller. The electronic device includes a processor, a display device and a second communication circuit unit, wherein a wireless connection is established by the first communication circuit unit and the second communication circuit unit, and the established connection is used for transmitting data between the controller and the electronic device. Each of the sensors is configured to periodically generate sensing data by determining a triggered area of each of the sensors, wherein the triggered area is an area, covered by a finger of a plurality of fingers of the hand, of a surface on which each of the sensors disposed, wherein the plurality of sensing data corresponding to the sensors are transmitted to the processor via the wireless connection. The processor is configured to identify a plurality of effective sensors among the sensors according to the generated sensing data of the sensors, wherein a sensing value of the sensing data of each of the effective sensors is larger than an effective sensing threshold. The processor is further configured to group the effective sensors into a plurality of sensor groups respectively corresponding to the fingers, and obtain a bending angle of one finger among the fingers according to the sensing values of the sensing data of all effective sensors in one sensor group corresponding to the said one finger among the sensor groups. Furthermore, the processor is further configured to instruct the display device to render a virtual hand having a plurality of virtual fingers corresponding to the fingers into a virtual space corresponding to the electronic device. Moreover, the processor is further configured to determine to bend one virtual finger corresponding to the said one finger among the virtual fingers according to the obtained bending angle of the said one finger, so as to render the virtual hand having a gesture matching to a gesture of the hand sensed by the sensing device.

In a further embodiment, a controller connected to an electronic device is provided, wherein the controller are operated by a user. The controller includes a sensing device, a first communication circuit unit and a processor, wherein a wireless connection is established by the first communication circuit unit and a second communication circuit unit of the electronic device, and the established connection is used for transmitting data between the controller and the electronic device. The sensing device includes a plurality of sensors disposed on one or more surfaces of the controller, wherein each of the sensors is configured to periodically generate sensing data by determining a triggered area of each of the sensors, wherein the triggered area is an area, covered by a finger of a plurality of fingers of a hand worn by the controller, of a surface on which each of the sensors disposed, wherein the plurality of sensing data corresponding to the sensors are transmitted to the processor. The processor is configured to identify a plurality of effective sensors among the sensors according to the generated sensing data of the sensors, wherein a sensing value of the sensing data of each of the effective sensors is larger than an effective sensing threshold, wherein the processor is further configured to group the effective sensors into a plurality of sensor groups respectively corresponding to the fingers, where the processor is further configured to obtain a bending angle of one finger among the fingers according to the sensing values of the sensing data of all effective sensors in one sensor group corresponding to the said one finger among the sensor groups, wherein the bending angle of the said one finger is transmitted to a further processor of the electronic device via the wireless connection. Furthermore, the further processor is configured to instruct a display device of the electronic device to render a virtual hand having a plurality of virtual fingers corresponding to the fingers into a virtual space corresponding to the electronic device, wherein the further processor is further configured to determine to bend one virtual finger corresponding to the said one finger among the virtual fingers according to the obtained bending angle of the said one finger, so as to render the virtual hand having a gesture matching to a gesture of the hand sensed by the sensing device.

In a further embodiment, a computer-implement operating method adapted to an electronic system is provided, wherein the electronic system comprises a controller and an electronic device. The method includes periodically generating, by each of a plurality of sensors of the controller, sensing data by determining a triggered area of each of the sensors, wherein the triggered area is an area, covered by a finger of a plurality of fingers of a hand worn the controller, of a surface on which each of the sensors disposed; identifying a plurality of effective sensors among the sensors according to the generated sensing data of the sensors, wherein a sensing value of the sensing data of each of the effective sensors is larger than an effective sensing threshold; grouping the effective sensors into a plurality of sensor groups respectively corresponding to the fingers; obtaining a bending angle of one finger among the fingers according to the sensing values of the sensing data of all effective sensors in one sensor group corresponding to the said one finger among the sensor groups; instructing a display device of the electronic device to render a virtual hand having a plurality of virtual fingers corresponding to the fingers into a virtual space corresponding to the electronic device; and bending one virtual finger corresponding to the said one finger among the virtual fingers according to the obtained bending angle of the said one finger, so as to render the virtual hand having a gesture matching to a gesture of the hand sensed by the controller.

Based on the foregoing embodiment, the provided electronic system, controller and computer-implement operating method for the same are capable of generating a plurality of sensing data by a plurality of sensor groups corresponding to a plurality of fingers disposed on surfaces of the controller of the electronic system, obtaining bending angles of the fingers according to the sensing data, rendering a plurality of virtual fingers corresponding to the fingers into a virtual space corresponding to the electronic system, and bending the virtual fingers according to the corresponding bending angles, so as to accurately render a virtual hand having a gesture matching to a gesture of the hand sensed by the controller. Therefore, the interaction ability of the electronic system is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6B illustrating mapping tables according to an embodiment of the invention.

FIG. 7A is a flowchart of obtaining a bending angle by generated waveform according to an embodiment of the invention.

DESCRIPTION OF THE EMBODIMENTS

Figure 1A:
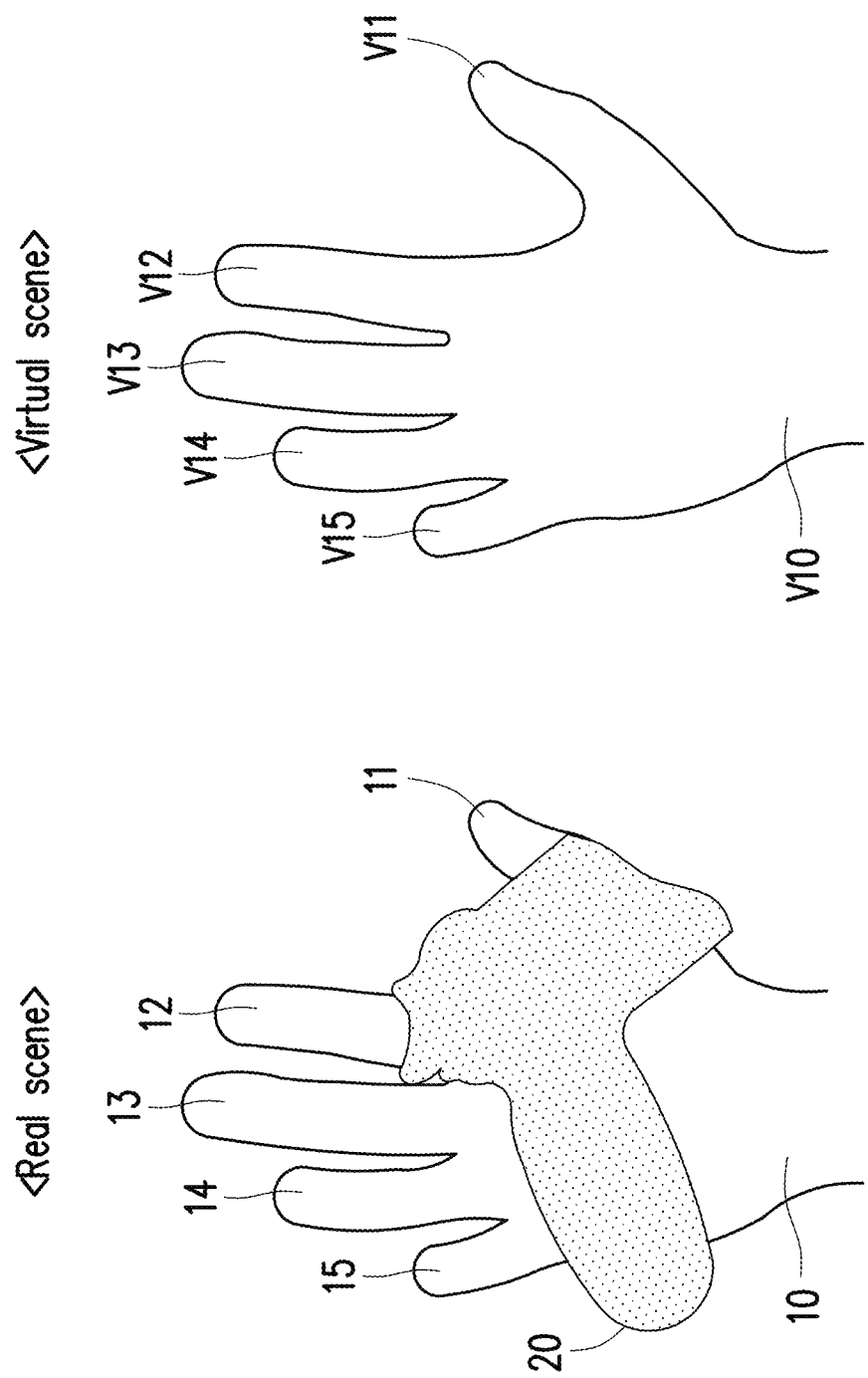
FIG. 1A is a schematic diagram illustrating a hand in a real scene and a corresponding virtual hand in a virtual scene according to an embodiment of the invention.

FIG. 1A is a schematic diagram illustrating a hand in a real scene and a corresponding virtual hand in a virtual scene according to an embodiment of the invention. Referring to FIG. 1A, in an embodiment of the invention, as illustrated in the real scene of the FIG. 1A, the provided wearable electronic system, the controller 20 of the wearable electronic system and the operating method thereof may sense bending angles of fingers 11-15 of a hand 10 of a user, so as to render, as illustrated in the virtual scene of the FIG. 1A, a virtual hand V10 and virtual fingers V11-V15 of the virtual hand V10 according to the sensed bending angles. The controller 20 may be worn on the hand 10 via a fastener of the controller 20, or the controller 20 may be operated by the hand 10 of the user of the wearable electronic system.

Figure 1B:
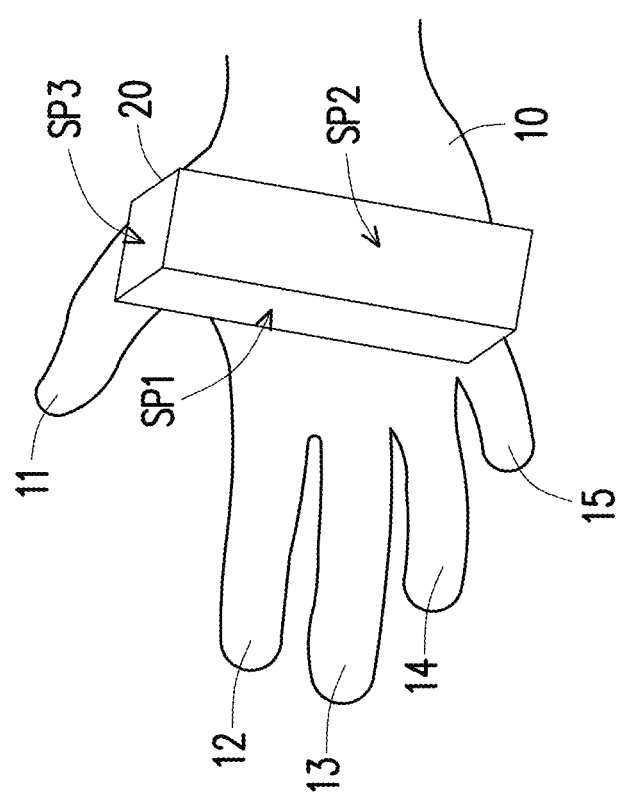
FIG. 1B is a schematic diagram illustrating a controller of a wearable electronic system at a hand according to an embodiment of the invention.
Figure 1C:
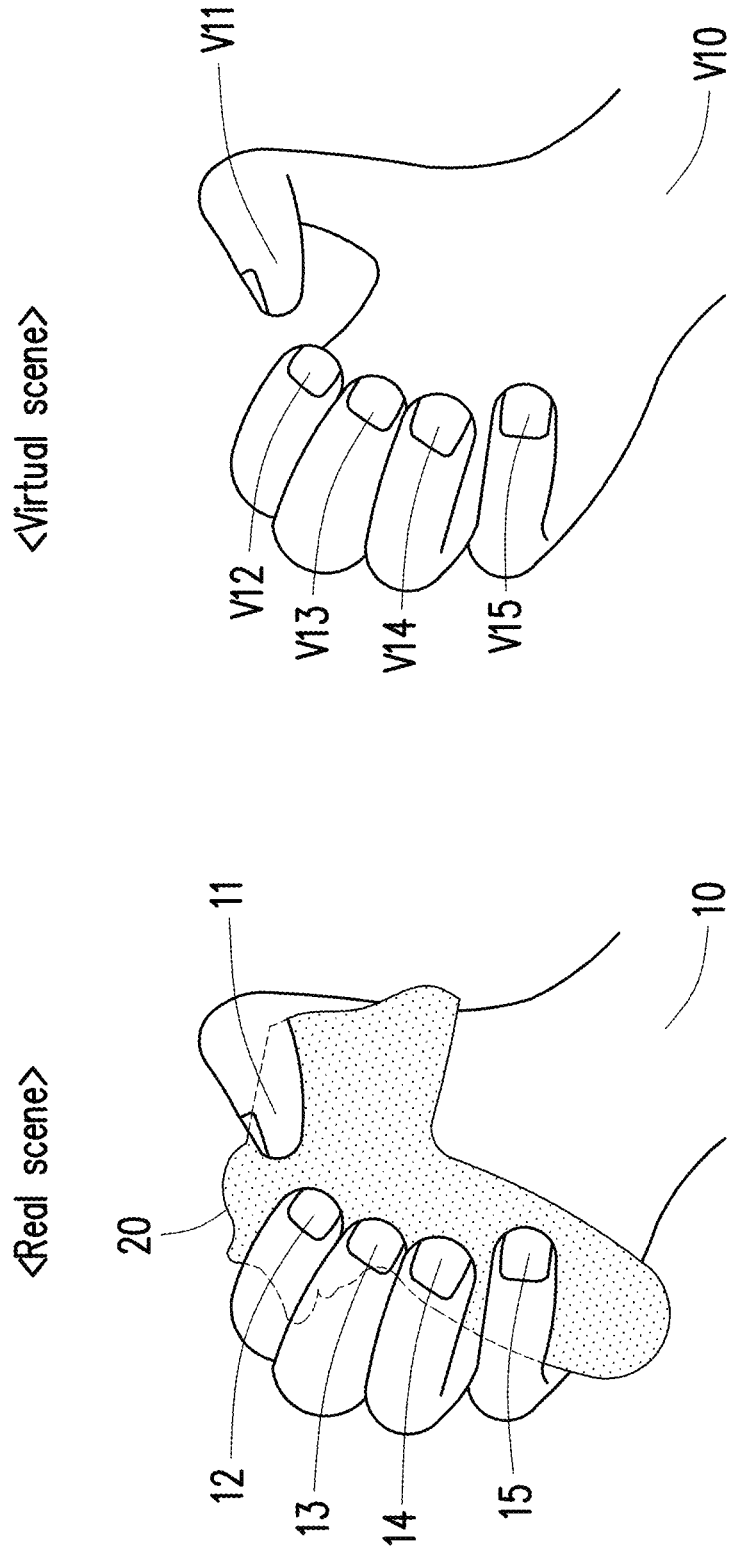
FIG. 1C is a schematic diagram illustrating a hand having bending fingers in a real scene and a corresponding virtual hand in a virtual scene according to an embodiment of the invention.

FIG. 1B is a schematic diagram illustrating a controller of a wearable electronic system at a hand according to an embodiment of the invention. Referring to FIG. 1B, the controller 20 has a plurality of surfaces (e.g., surfaces SP1-SP3). As illustrated by FIG. 1B, the surfaces SP1 and SP2 (the surfaces SP1 and SP2 may be referred to as first surfaces) is predetermined as being touched by fingers 12-15 (a plurality of fingers), and the surface SP3 (the surface SP3 may be referred to as second surface) is predetermined as being touched by finger 11 (only one finger).

Figure 2A:
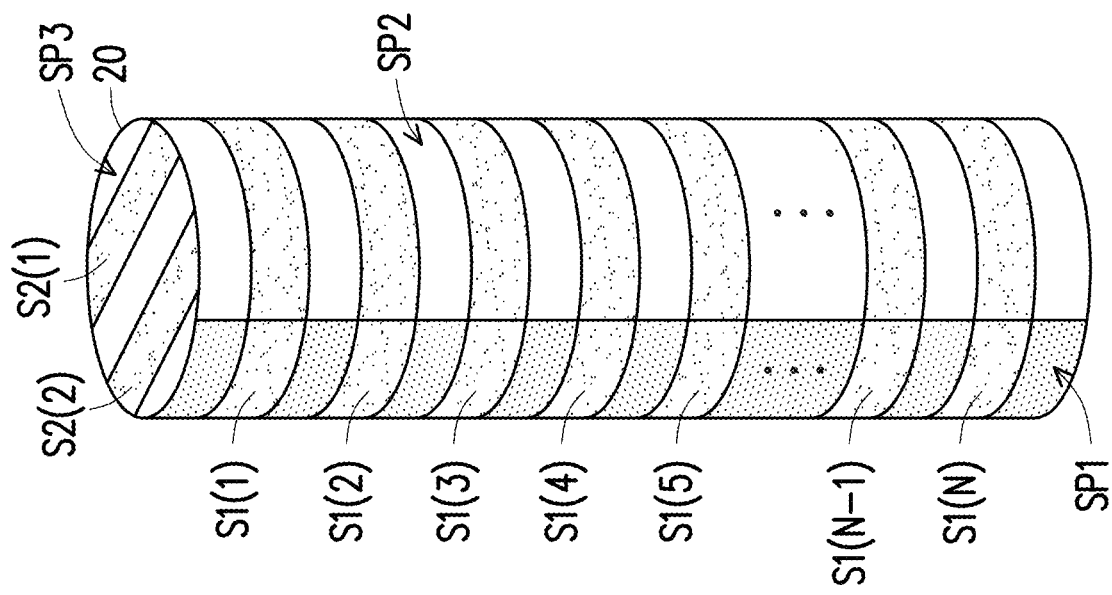
FIG. 2A is a schematic diagram illustrating a controller of a wearable electronic system on which a plurality of sensors are disposed according to an embodiment of the invention.
Figure 2A:
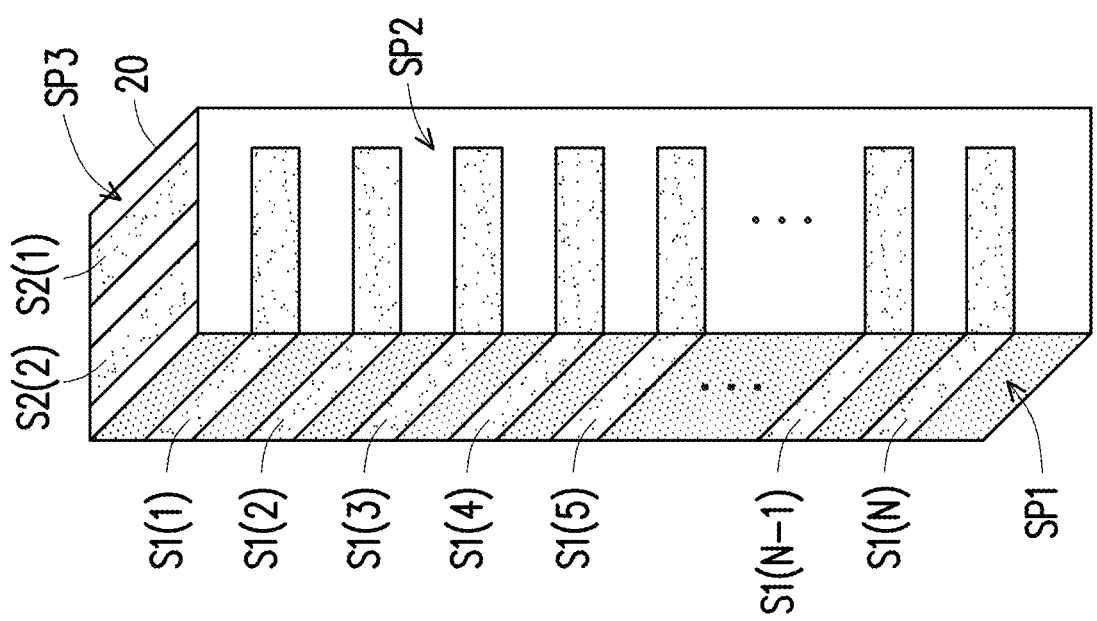

FIG. 2A is a schematic diagram illustrating a controller of a wearable electronic system on which a plurality of sensors are disposed according to an embodiment of the invention. Referring to FIG. 2A, in an embodiment, controller 20 includes a plurality of sensors (e.g., sensors S1(1)-S1(N)) disposed on surfaces SP1 and SP2 of the controller 20, and a plurality of sensors (e.g., sensors S2(1)-S2(2)) disposed on surface SP3.

It should be mentioned that in the embodiments of the invention, the controller is used for controlling the corresponding wearable electronic system, but the invention is not limited hereto. For example, in an embodiment, the provided controller and the computer-implement operating method may be applied on other kinds of the electronic system. In this embodiment, the electronic system may include a host system (e.g., a mobile device, a smart phone, a laptop, a personal computer, a gaming server, or a service server), a display system connecting to the host system, and a controller connecting to the host system, wherein the display system is an electronic device which is used for providing the visual content to the user of the display system, and the display system may be, for example, a VR/AR/MR HMD, an electronic glasses, an electronic contact lens, an electronic eye. The connecting therebetween may be implemented by wire or wireless connection.

Figure 2B:
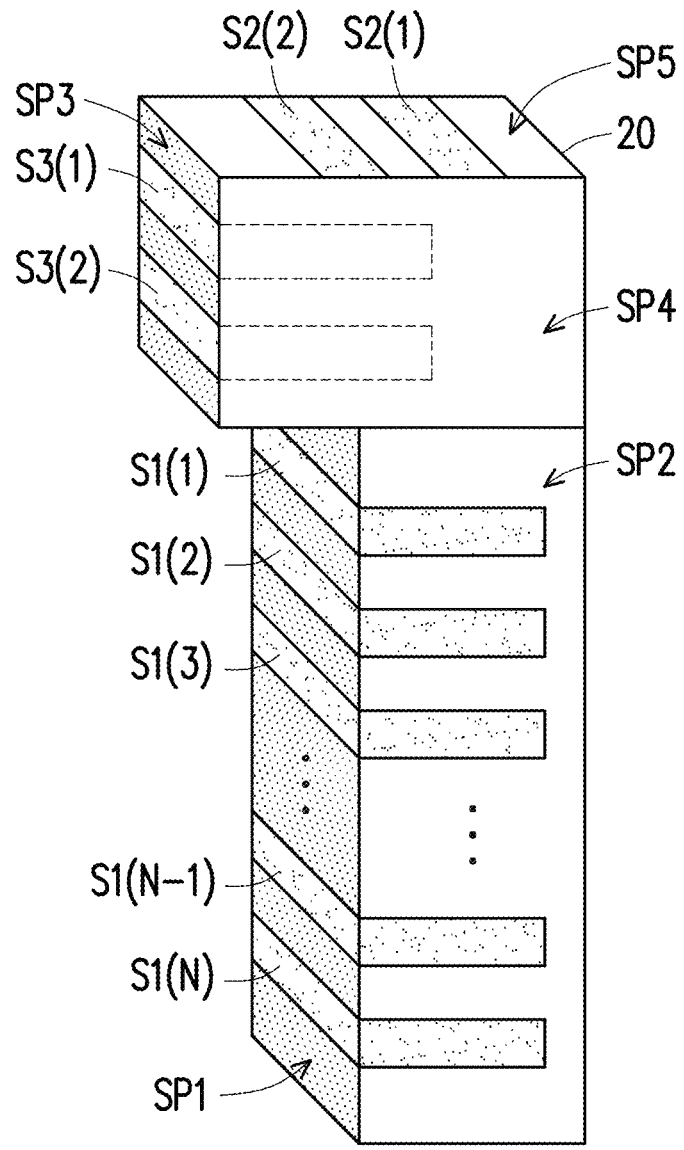
FIG. 2B is a schematic diagram illustrating a further controller of a wearable electronic system on which a plurality of sensors are disposed according to a further embodiment of the invention.

FIG. 2B is a schematic diagram illustrating a further controller of a wearable electronic system on which a plurality of sensors are disposed according to a further embodiment of the invention. Referring to FIG. 2B, in an embodiment, the controller 20 may include a plurality of sensors (e.g., sensors S1(1)-S1(N)) disposed on surfaces SP1-SP2, a plurality of sensors (e.g., sensors S3(1)-S3(2)) disposed on surfaces SP3-SP4, and a plurality of sensors (e.g., sensors S2(1)-S2(2)) disposed on surface SP5. Furthermore, in the embodiment, the surface SP5 is predetermined as being touched by one finger (e.g., thumb), the surface SP3-SP4 are predetermined as being touched by another finger (e.g., index finger), and the surface SP1-SP2 are predetermined as being touched by a plurality of fingers (e.g., middle finger, ring finger and little finger). The sensors S1(1)-S1(N) may be used for sensing the bending angles of the fingers (e.g., middle finger, ring finger and little finger) corresponding to the surfaces SP1-SP2 related to the sensors S1(1)-S1(N), the sensors S2(1)-S2(2) may be used for sensing the bending angle of the finger (e.g., thumb) corresponding to the surface SP5 related to the sensors S2(1)-S2(2), and sensors S3(1)-S3(2) may be used for sensing the bending angle of the finger (e.g., index finger) corresponding to the surface SP3-SP4 related to the sensors S3(1)-S3(2). In another embodiment, the sensors S1(1)-S1(N) may not be stretched into the surface SP2, or the sensors S3(1)-S3(2) may not be stretched into the surface SP4.

Figure 2C:
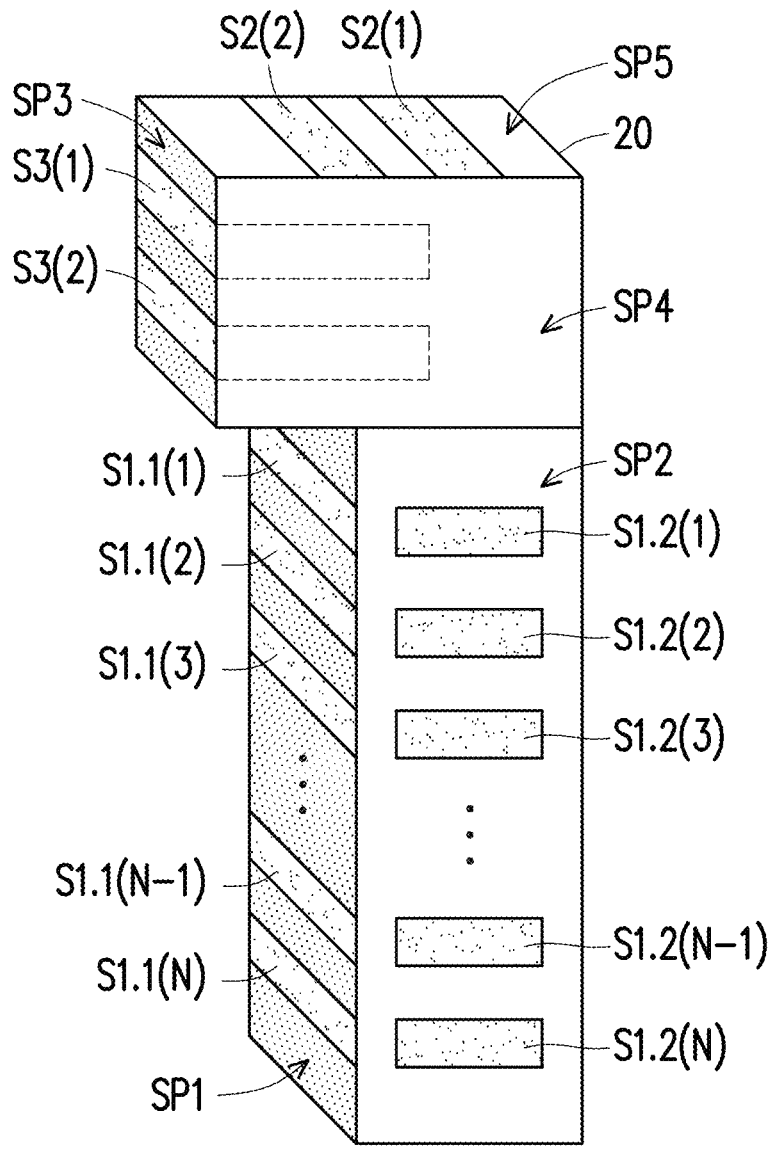
FIG. 2C is a schematic diagram illustrating a further controller of a wearable electronic system on which a plurality of sensors are disposed according to a further embodiment of the invention.

FIG. 2C is a schematic diagram illustrating a further controller of a wearable electronic system on which a plurality of sensors are disposed according to a further embodiment of the invention. Referring to FIG. 2C, in an embodiment, the each of the sensors S1(1) to S1(N) includes a plurality of sub-sensors, e.g., the sensors S1(1)-S1(N) includes sub-sensors S1.1(1) and S1.2(1) to S1.1(N) and S1.2(N). In an embodiment, the sub-sensors S1.1(1) to S1.1(N) corresponding to root parts of fingers are used for sensing bending angles of fingers mainly, and the sub-sensors S1.2(1) to S1.2(N) corresponding to follow parts/tip parts of the fingers are used for determining whether the fingers are in grip status (the fingers are in maximum bending angles, or the fingers are determined as holding/grip the controller fully) mainly. N is an integer larger than 1.

Figure 2D:
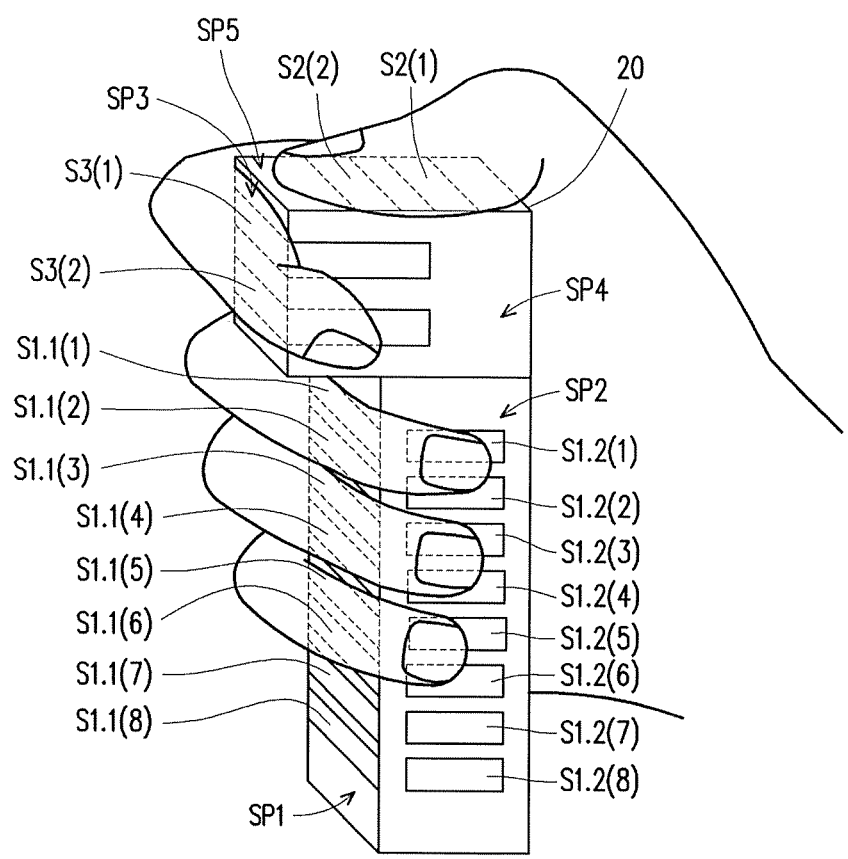
FIG. 2D is a schematic diagram illustrating a hand holding a controller of a wearable electronic system according to a further embodiment of the invention.

FIG. 2D is a schematic diagram illustrating a hand holding a controller of a wearable electronic system according to a further embodiment of the invention. Referring to FIG. 2D, continue to the example of the controller in the FIG. 2C, as illustrated by FIG. 2D, when the hand 10 holding the controller 20, each of the fingers 11-15 of the hand 10 bends and covers a plurality of sensors. For example, the finger 11 covers sensors S2(1)-S2(2); the finger 12 covers sensors S3(1)-S3(2); the finger 13 covers sensors S1(1)-S1(2) (e.g., sub-sensors S1.1(1)-S1.1(2) and sub-sensors S1.2(1)-S1.2(2)); the finger 14 covers sensors S1(3)-S1(4) (e.g., sub-sensors S1.1(3)-S1.1(4) and sub-sensors S1.2(3)-S1.2(4)); and the finger 15 covers sensors S1(5)-S1(6) (e.g., sub-sensors S1.1(5)-S1.1(6) and sub-sensors S1.2(5)-S1.2(6)).

Figure 2E:
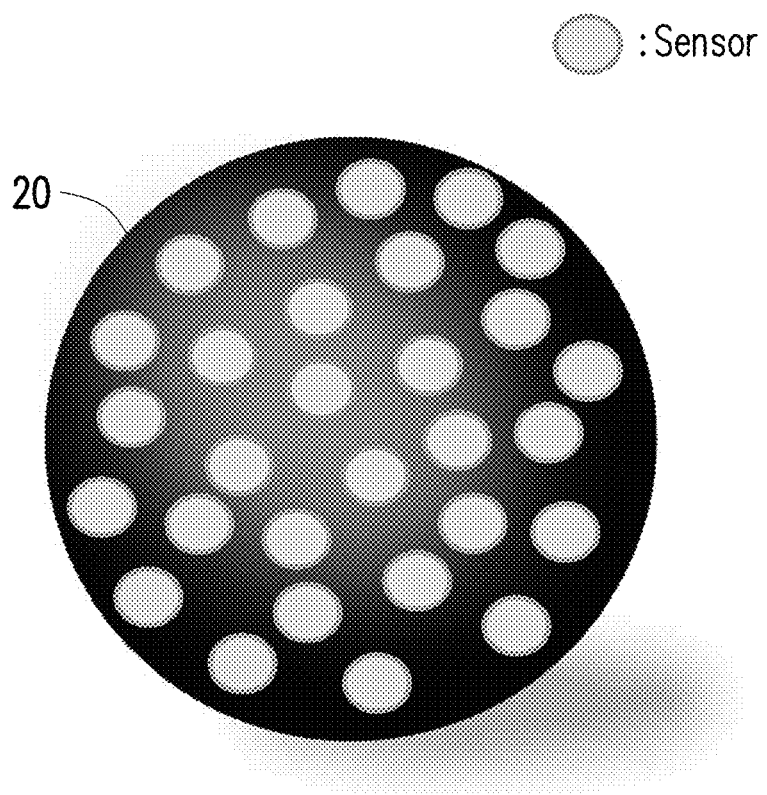
FIG. 2E is a schematic diagram illustrating a spherical controller of a wearable electronic system on which a plurality of sensors are disposed according to a further embodiment of the invention.

FIG. 2E is a schematic diagram illustrating a spherical controller of a wearable electronic system on which a plurality of sensors are disposed according to a further embodiment of the invention. Referring to FIG. 2E, in an embodiment, the controller 20 may be a spherical controller, and a plurality of sensors are disposed on the surface of the controller 20. The sensors on the spherical controller 20 illustrated by FIG. 2E are also used for sensing the bending angles of fingers of a hand grasping the spherical controller 20. It should be noted that, the invention does not limit the shape of the controller 20 of the wearable electronic system. For example, the controller of the wearable electronic system provided by the embodiment of the invention may be spherical, cylindrical, cuboid, irregular three-dimensional (3D) structure or other suitable 3D structures.

Figure 3A:
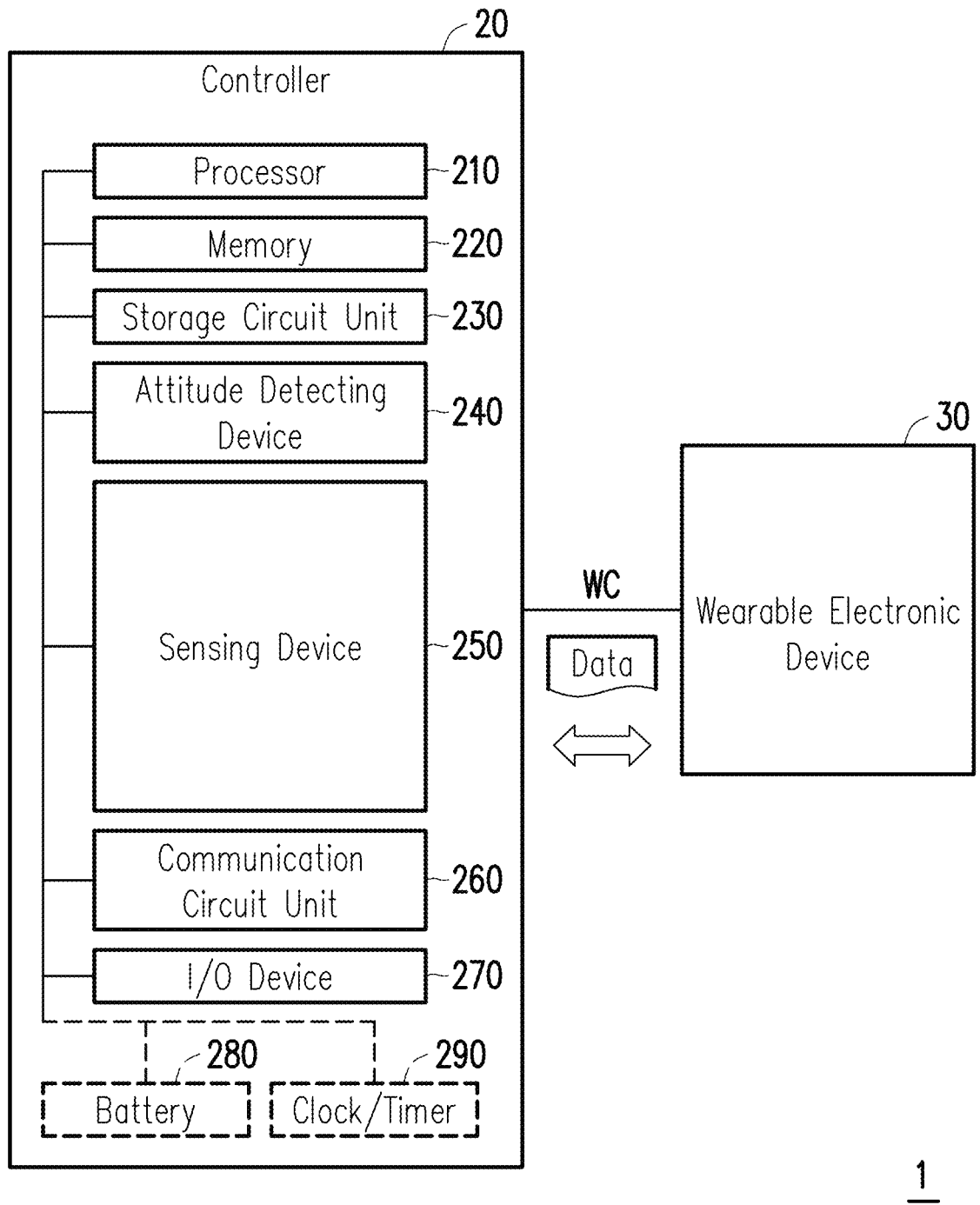
FIG. 3A is a block schematic diagram illustrating a controller and a wearable electronic device of a wearable electronic system according to an embodiment of the invention.

FIG. 3A is a block schematic diagram illustrating a controller and a wearable electronic device of a wearable electronic system according to an embodiment of the invention. Referring to FIG. 3A, in an embodiment, a wearable electronic system 1 includes a wearable electronic device 30 and a controller 20. The controller 20 is connected to the wearable electronic device 30 by an established wireless/wired connection WC, and data may be transmitted between the controller 20 and the wearable electronic device 30.

The controller 20 includes a processor 210, a memory 220, a storage circuit unit 230, an attitude detecting device 240, a sensing device 250, a communication circuit unit 260, a I/O device 270. The processor 210 couples to the memory 220, the storage circuit unit 230, the attitude detecting device 240, the sensing device 250, the communication circuit unit 260, the I/O device 270. In a further embodiment, the controller 20 further includes a battery 280 and a clock/timer 290 coupled to the processor 210.

Figure 3B:
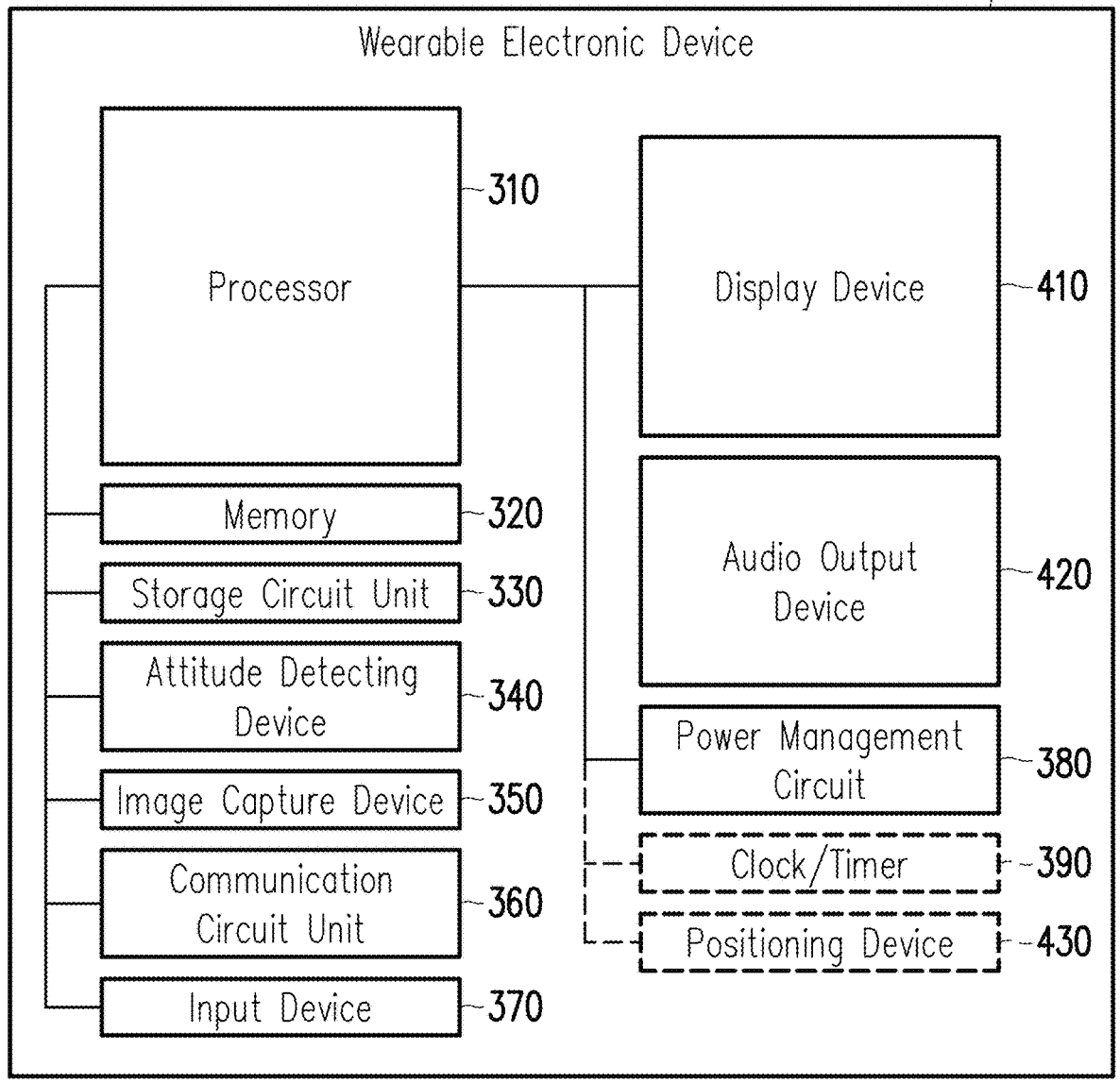
FIG. 3B is a block schematic diagram illustrating a wearable electronic device of a wearable electronic system according to an embodiment of the invention.

FIG. 3B is a block schematic diagram illustrating a wearable electronic device of a wearable electronic system according to an embodiment of the invention. Referring to FIG. 3B, the wearable electronic device 30 includes a processor 310, a memory 320, a storage circuit unit 330, an attitude detecting device 340, an image capture device 350, a communication circuit unit 360, an input device 370, a display device 410 and an audio output device 420. The processor 310 couples to the memory 320, the storage circuit unit 330, the attitude detecting device 340, the image capture device 350, the communication circuit unit 360, the input device 370, the display device 410 and the audio output device 420. In a further embodiment, the wearable electronic device further includes a power management circuit 380, a clock/timer 390 and a positioning device 430 coupled to the processor 310.

In the embodiment, the processor 210/processor 310 may be, for example, a central processing unit (CPU) of the controller 20/wearable electronic device 30 and, thus, control the overall operation of controller 20/wearable electronic device 30. In certain embodiments, the processor 210/processor 310 accomplishes this by loading software or firmware stored in a non-transitory computer readable recording medium (or storage circuit unit 230/storage circuit unit 330), and executing the software or firmware thereof (e.g., the processor 210/processor 310 is programmed), so as to implement the operating method provided in the embodiment as well. The processor 210/processor 310 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 220/memory 320 is configured to temporarily store data instructed by the processor 210/processor 310. The memory may be, for example, a dynamic random access memory, a static random access memory or other suitable memory. The processor 210/processor 310 may load program code modules into the memory 220/memory 320 and execute the loaded program code modules to implement the operating method provided by the embodiments of the present invention.

The storage circuit unit 230/storage circuit unit 330 may be, for example, a non-volatile memory (NVM) module (e.g., a circuit module including EEPROM, flash memory, PCRAM, ReRAM, MRAM or other types of suitable NVM), memory card, or solid-state drive. The storage circuit unit 230/storage circuit unit 330 may store data including data (e.g., software or firmware) for managing the controller 20/wearable electronic device 30; data to be exchanged with other electronic devices/mobile devices; applications; data input by the user, or other types of data, which are not particularly limited by the invention. In addition, the storage circuit unit 230/storage circuit unit 330 may also store a database record information related to the operating method provided by the embodiment by the instruction of the processor 210/processor 310.

The attitude detecting device 240/attitude detecting device 340 is configured to detect the attitude of whole controller 20/wearable electronic device 30. The attitude detecting device 240/attitude detecting device 340 may include, for example, inertial measurement units (IMU), such as accelerometers, gyroscopes and may also include magnetometers. The attitude detecting device 240/attitude detecting device 340 utilizes the IMU's sensor data to transfer 3-dimensional rotations of the controller 20/wearable electronic device 30 in the real-world into an attitude representation defined by parameters, such as Euler angles, yaw angle, pitch angle, and roll angle.

The image capture device 350 includes one or more lenses disposed on the surface (e.g., the front surface) of the wearable electronic device 30 and including photosensitive elements for respectively sensing the intensity of light entering each of the lenses to generate an image. The photosensitive element is, for example, a Charge Coupled Device (CCD), a Complementary Metal-Oxide Semiconductor (CMOS) element, or other components, and the present invention is not limited thereto.

The communication circuit unit 260/communication circuit unit 360 is configured to transmit or receive data through wireless connection WC established by the communication circuit unit 260/communication circuit unit 360. In another embodiment, the communication circuit unit 260/communication circuit unit 360 is further configured to establish a network connection to internet or other communication circuit unit of other electronic device (e.g., other wearable electronic device or controller). The communication circuit unit 260/communication circuit unit 360 may be, for example, the circuit/chipset supporting one or a combination of the following protocols: a Global System for Mobile Communication (GSM) system, a Personal Handyphone System (PHS), and a Code Division Multiple Access (CDMA) system. Wireless Fidelity (WiFi) system, Worldwide Interoperability for Microwave Access (WiMAX) system, Third-generation wireless communication technology (3G), Fourth-generation wireless communication technology (4G), Fifth-generation wireless communication technology (5G), Long Term Evolution (LTE), Bluetooth (BT) communication technology, and is not limited thereto.

The I/O device 270 includes an input device and an output device. The input device of the I/O device 270 and the input device 370 are configured to generate input data or input instruction according to an applied input operation by a user. The generated input data or input instruction may be sent to processor 210, and the processor 210 may record the input data or perform an operation corresponding to the input instruction. The input device of the I/O device 270 and the input device 370 may include, for example, a plurality of physical button, joystick, touch pad, a touch screen, microphone, pupil tracker or other suitable input devices. In another embodiment, the sensing device 250 is integrated into the I/O device 270, such that the user of the controller 20 may input data or instruction via the I/O device 270 by a gesture sensed by the sensing device 250 (the I/O device 270). The output device is configured to output media content (e.g., the image content, sound content, or the video content) according to the instruction sent from the processor 210. The output device may include, for example, a screen, a speaker, a projector, a touch screen, or other suitable output device. In another embodiment, the output device further includes a vibration device which is configured to generate a vibration according to the instruction sent by the processor 210, so as to provide a function for the controller 20 to interact with the user.

The battery 280 is configured to provide power to the controller 20. The power management circuit 380 is configured to manage power provided to the wearable electronic device 30. The power management circuit 380 may include battery.

The clock/timer 290 or the clock/timer 390 is configured to indicate current time of the controller 20 or the wearable electronic device 30. In an embodiment, the clock/timer (e.g., the clock/timer 290 or the clock/timer 390) may be a counter which records and accumulates a timestamp (also referred to as time information) continuously according to a predetermined frequency.

In an embodiment, assuming that the wearable electronic device 30 is a virtual reality head-mounted display device (VR HMD), the display device 410 may include one or more screens disposed on a side which is facing to the eyes of the user when the user (also called as the wearer) wears the wearable electronic device 30. In this embodiment, the wearer may see the visual content (e.g., virtual objects or a part of the virtual world corresponding to the wearable electronic device) rendered by the display device 410. The part of the virtual world seen by the wearer via the one or more screens is referred to as a seen space of the virtual world corresponding to the wearable electronic device 30. The size of the seen space is determined by a field of view corresponding to the wearer in the virtual world, wherein the field of view may be predetermined by the specification of the virtual world and the screens according to the actual needs. The screens, for example, may be an organic light-emitting diode (OLED) display panel, active matrix organic light-emitting diode (AMOLED) display panel, Field Sequential liquid crystal display (FS-LCD) panel, thin-film transistor liquid crystal display (TFT-LCD) panel, or other suitable display panel. In another embodiment, the display device 410 is configured to render the visual content on the lenses in a manner of projecting an image of the visual content onto the display surface of the display device 410.

The audio output device 420 is configured to output sound. The audio output device 420 may be, for example, a speaker or an earphone. In an embodiment, the audio output device 420 may include wireless communication circuit which may receive sound data from the communication circuit unit 360 via a further wireless connection established therebetween.

The position device 430 is configured to locate the position of the wearable electronic device 30. The position device 430 may include a Global Positioning System (GPS) circuit module, and the position may be a global coordinate of the wearable electronic device 30 obtained via the GPS system. The processor 310 may identify the real-world environment around the wearable electronic device 30 by mapping the global coordinate with predetermined map information of the real-world. In an embodiment, the processor 310 may construct the virtual space around the wearable electronic device 30 according to the identified real-world environment. In another embodiment, the processor 310 may construct the virtual space around the wearable electronic device 30 according to the absolute coordinate of the wearable electronic device 30 without identifying the real-world environment around the wearable electronic device 30, wherein the absolute coordinate of the wearable electronic device 30 may be periodically identified with the movement of the position of the wearable electronic device 30 from a preset starting absolute coordinate. In an embodiment, the obtained global coordinate of the wearable electronic device 30 may be converted into the wearable electronic device 30's absolute coordinate in a virtual space (also referred to as a virtual-world) corresponding to the wearable electronic device 30.

Furthermore, in the embodiment, the position device 430 may apply the Simultaneous Localization and Mapping (SLAM) algorithm to identify the real-world environment around the wearable electronic device 30, so as to generate the corresponding map information (e.g., map around the wearable electronic device 30), and to identify the position of the wearable electronic device 30 in the generated map. A series of related image identifications performed on the nearby images captured by the image capture device 350 and distance detections performed by light sensors (e.g., laser range finder) may be used for implementing the SLAM algorithm.

Figure 3C:
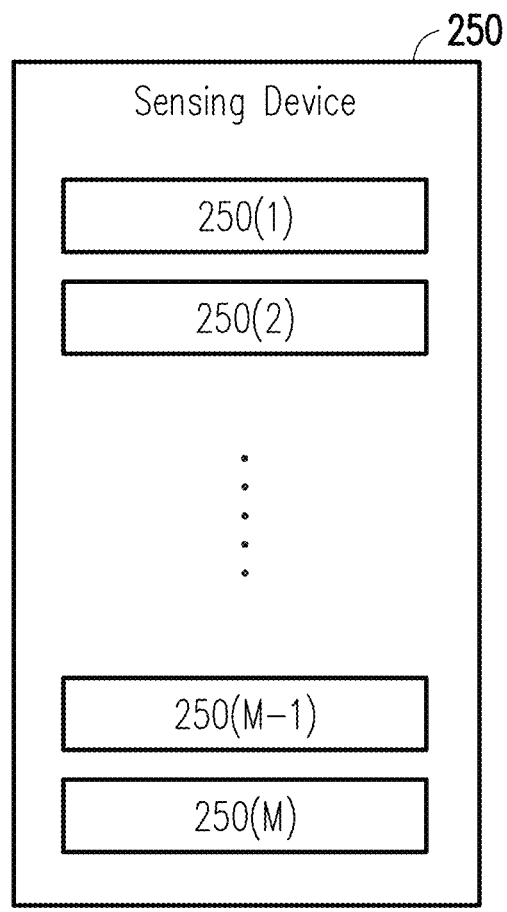
FIG. 3C is a block schematic diagram illustrating a sensing device of a controller of a wearable electronic system according to an embodiment of the invention.

FIG. 3C is a block schematic diagram illustrating a sensing device of a controller of a wearable electronic system according to an embodiment of the invention. Referring to FIG. 3C, the sensing device 250 includes a plurality of sensors 250(1) to 250(M). The sensors 250(1) to 250(M) are disposed on the surface(s) of the controller or disposed in the surface layer of the case of the controller. Each of the sensors 250(1) to 250(M) may be, for example, a capacitive touch sensor, a capacitive proximity sensor, a pressure sensor, a light sensor, or other types of suitable proximity sensor.

Figure 4A:
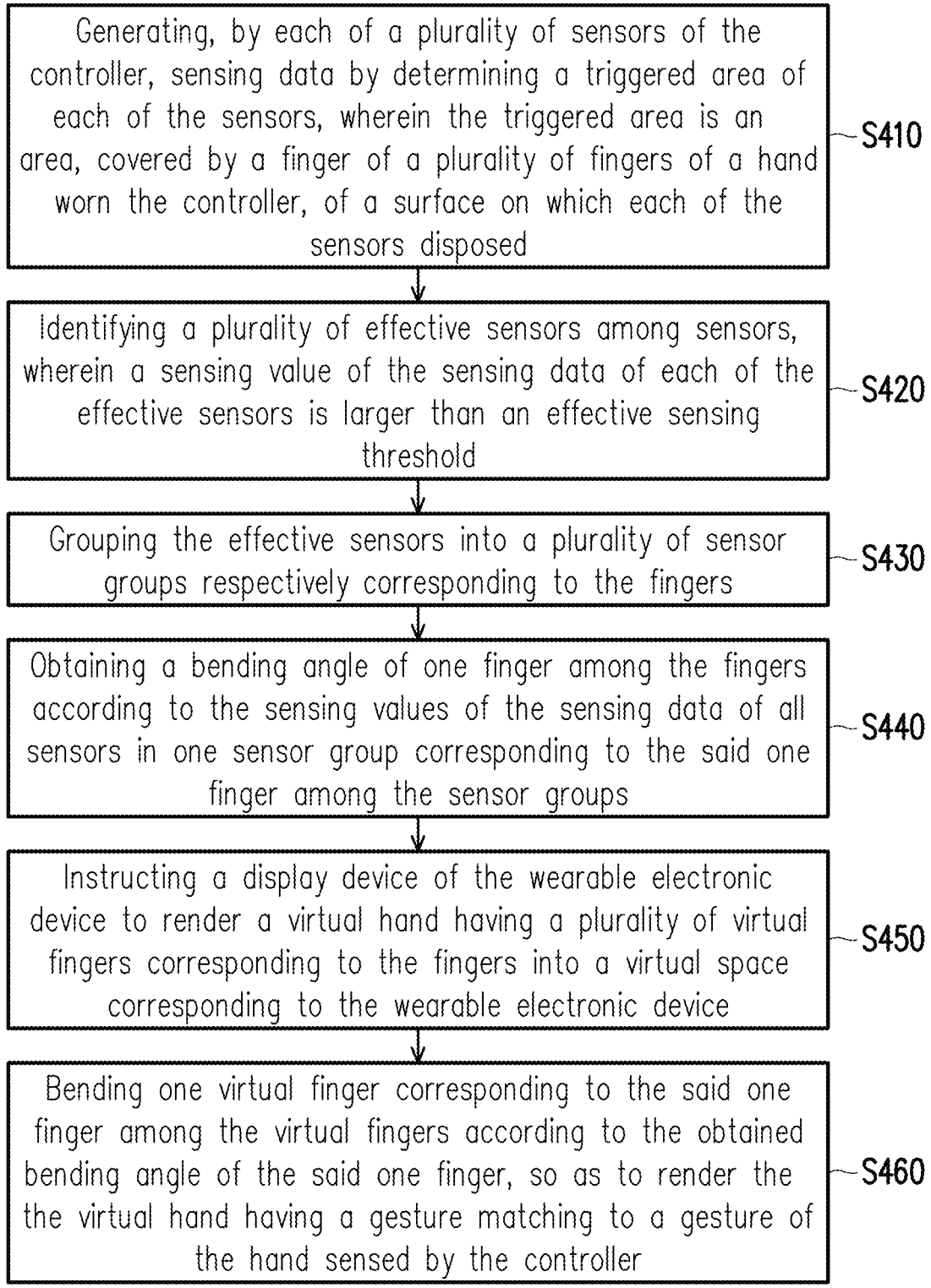
FIG. 4A is a flowchart illustrating a computer-implement operating method according to an embodiment of the invention.

FIG. 4A is a flowchart illustrating a computer-implement operating method according to an embodiment of the invention. Referring to FIG. 4A, in step S410, periodically generating, by each of a plurality of sensors 250(1) to 250(M) of the controller 20, sensing data by determining a triggered area of each of the sensors, wherein the triggered area is an area, covered by a finger of a plurality of fingers of a hand worn the controller 20, of a surface on which each of the sensors disposed. In the embodiment, the shape of each of the sensors may be designed as a shape (e.g., a bar shape or a rectangle) which is corresponding to the shape of each of the fingers, and the disposing direction of the sensors is predetermined as the direction along which the corresponding fingers cover or touch the surface(s) of the controller 20. Furthermore, the length (or the size) of a triggered area (the width of each of the triggered area is preset) may be determined more easily because of the predetermined shape of each of the sensors. The detail of the concept of the triggered area would be explained by FIG. 4B below.

Figure 4B:
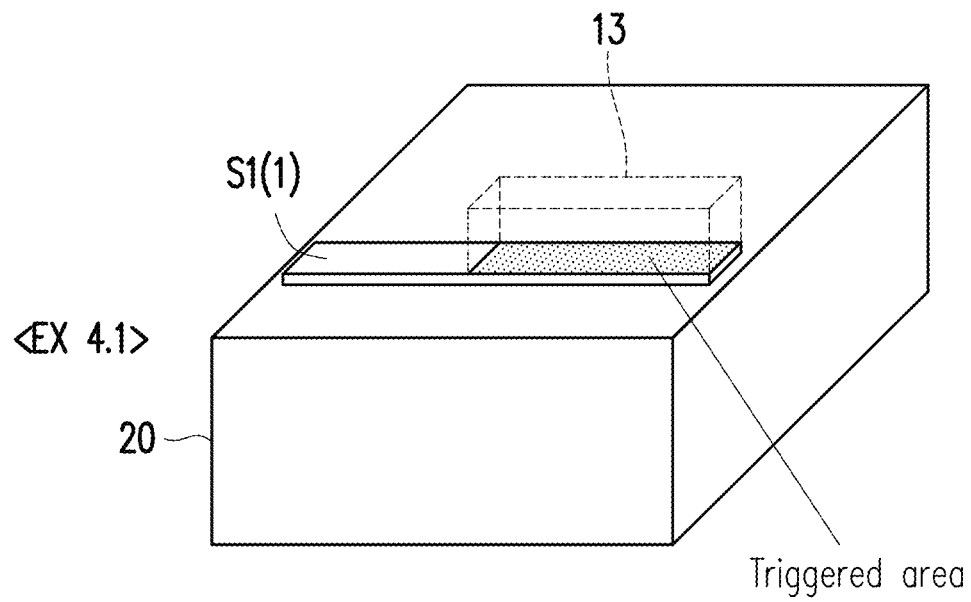
FIG. 4B is a schematic diagram illustrating an effective area corresponding to an object sensed by a sensor of a controller of a wearable electronic system according to an embodiment of the invention.
Figure 4B:
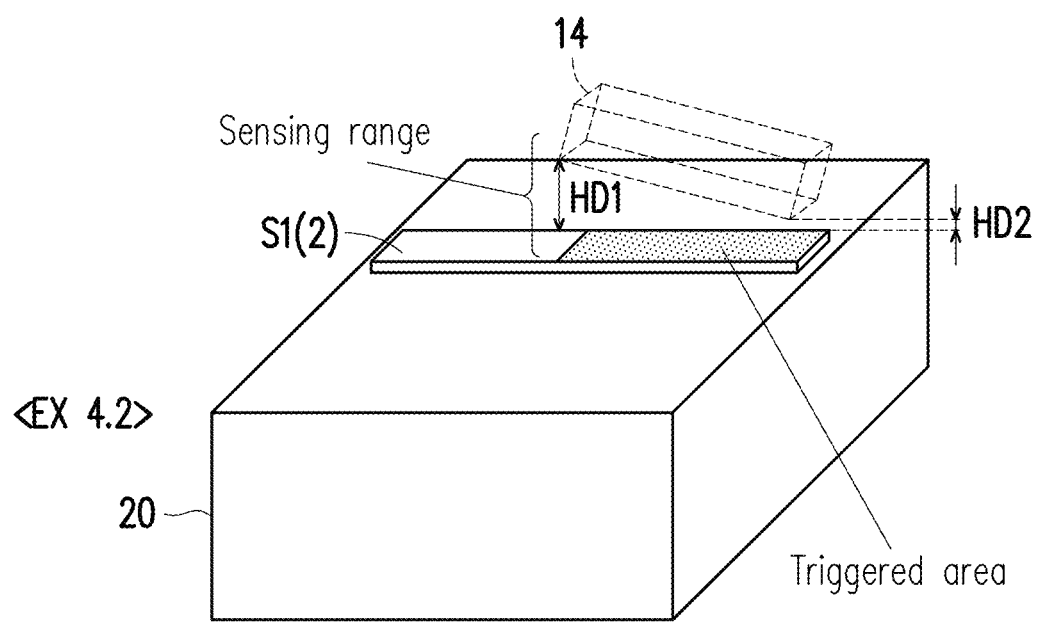

FIG. 4B is a schematic diagram illustrating an effective area corresponding to an object sensed by a sensor of a controller of a wearable electronic system according to an embodiment of the invention. For example, in example <EX 4.1>, it is assumed that the middle finger 13 is covered above the sensor S1(1), and the middle finger 13 touches a region of surface of the sensor S1(1). In this example, the region (as illustrated as grey region of the surface of the sensor S1(1)) of the surface is triggered by the touch of the middle finger 13, and a sensing value generated by the sensor S1(1) is accordingly changed (e.g., the sensing value of the sensor is increased with the size of the touched region). In other words, the region of the surface under the middle finger 13 is also referred to as the triggered area, the sensor may sense a physical object touched at the triggered area, and the sensing value of the sensing data generated by one sensor is proportional to the size of the triggered area corresponding to the said one sensor.

Furthermore, in example <EX 4.2>, it is assumed that the ring finger 14 is covered above the sensor S1(2), but the ring finger 14 does not touched a region of surface of the sensor S1(2) (e.g., the ring finger 14 is hovered above the surface of the sensor S1(2) within a sensing range). In this example, the region (as illustrated as grey region of the surface of the sensor S1(2)) of the surface may be triggered by the covered ring finger 14 since the sensor may be triggered by a physical object existed within the sensing range, and a sensing value generated by the sensor S1(2) is accordingly changed (e.g., the sensing value of the sensor is increased with the size of the covered region). In other words, the region of the surface covered by the ring finger 14 is also referred to as the triggered area, the sensing value of the sensing data generated by one sensor is proportional to the size of the triggered area corresponding to the said one sensor, and the sensing value is further inversely proportional to the value of a hover distance between a physical object within the sensing range and the corresponding triggered area.

For example, the sensing value corresponding to the hover distance HD1 is smaller than another sensing value corresponding to the hover distance HD2. In other words, when hover distance between a finger and a covered region of the surface of a sensor is larger than the sensing range of the sensor, the corresponding sensing value is zero, and the region covered by the finger is not triggered, e.g., not triggered area. The sensing value generated by one sensor according to the triggered area of the said one sensor may be sent to the processor 210 or the processor 310 as the sensing data of the said one sensor.

Back to FIG. 4A, in step S420, identifying (by the processor 210 or the processor 310) a plurality of effective sensors among the sensors, wherein a sensing value of the sensing data of each of the effective sensors is larger than an effective sensing threshold. Specifically, the processor 210 or the processor 310 may compare the received sensing value of each of the sensors with the effective sensing threshold. In response to determining that one received sensing value of one sensor among the sensors is larger than the effective sensing threshold, the processor 210 or processor 310 identifies that the said one sensor is an effective sensor. In other words, the processor 210 or processor 310 may aware that fingers of a hand is covered on the identified effective sensors, and one or more sensors other than the effective sensors among all the sensors of the sensing device 250 are identified as not being covered by the fingers. It should be noted that, in an embodiment, the controller 20 would be the main device for obtaining the bending angles corresponding to fingers, the processor 210 may transmits the obtained bending angles to the processor 310, so as to let the processor 310 to render a gesture of a virtual hand according to the bending angles. Furthermore, in another embodiment, the wearable electronic device 30 would be the main device for obtaining the bending angles corresponding to fingers according to received sensing data generated by the sensing device 250 of the controller 20 (the controller 20 is configured to generate the sensing data/sensing values corresponding to the fingers holding the controller 20), and then the processor 310 may render a gesture of a virtual hand according to the obtained bending angles. Therefore, some steps described hereinafter are performed by the processor 210 or the processor 310.

Next, in step S430, grouping (by the processor 210 or the processor 310) the effective sensors into a plurality of sensor groups respectively corresponding to the fingers. Specifically, after the effective sensors are identified, the processor 210 or the processor 310 may group the effective sensors into different sensor groups respectively corresponding to different fingers of the hand, so as to identify sensors in each of the sensor groups corresponding to the fingers, and obtain the sensing values corresponding to each of the fingers from the identified sensors in each of the sensor groups corresponding to the fingers. The detail of the grouping process would explained below by FIG. 5.

Figure 5:
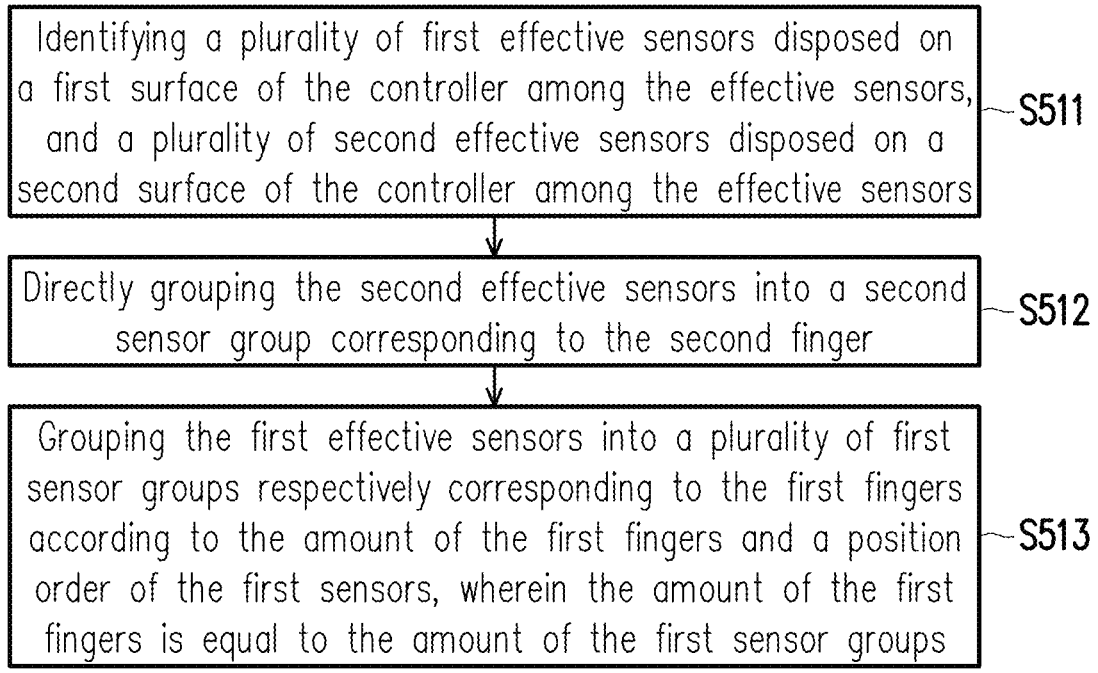
FIG. 5 is a flowchart of grouping a plurality of sensors into a plurality of sensor groups according to an embodiment of the invention.

FIG. 5 is a flowchart of grouping a plurality of sensors into a plurality of sensor groups according to an embodiment of the invention. Referring to FIG. 5, in step S511, identifying (by the processor 210 or the processor 310) a plurality of first effective sensors disposed on a first surface of the controller among the effective sensors, and a plurality of second effective sensors disposed on a second surface of the controller among the effective sensors. Specifically, the first surface is predetermined as one surface to be touched by a plurality of first fingers among the fingers, and the second surface is predetermined as one further surface to be touched by only a second finger (one finger other than the first fingers) among the fingers.

For example, as illustrated in FIG. 2B, it is assumed that surfaces SP1 and SP2 both are predetermined as being touched/covered by the middle finger, the ring finger and the little finger (e.g., surfaces SP1 and SP2 are the first surfaces, and the middle finger, the ring finger and the little finger are corresponding first fingers); the surface SP3 and SP4 both are predetermined as being touched/covered by the index finger (only one finger) (e.g., surfaces SP3 and SP4 are the second surfaces, and the index finger is the corresponding second finger); and the surface SP5 is predetermined as being touched/covered by the thumb (only one finger) (e.g., surface SP5 is the second surface, and the thumb is the corresponding second finger). The processor 210 or the processor 310 may identify: the effective sensors S1(1) to S1(13) among the sensors S1(1) to S1(N) disposed on the first surface SP1 and SP2 as the first effective sensors (assuming that N is not smaller than 13); the effective sensors S3(1) to S3(2) disposed on the second surface SP3 as the second effective sensors; the effective sensors S2(1) to S2(2) disposed on the second surface SP5 as the other second effective sensors.

Next, in step S512, directly grouping (by the processor 210 or the processor 310) the second effective sensors into a second sensor group corresponding to the second finger. Specifically, after the second sensors of each second surface are identified, the processor 210 or the processor 310 may directly group all second effective sensors disposed on a second surface, which is corresponding to only one finger (e.g., second finger), into a second sensor group since the second effective sensors would be only touched by the second finger, wherein the second sensor group is predetermined as being corresponding to the second finger. In other words, the processor 210 or the processor 310 may use the sensing data of all the second effective sensors in the second sensor group to determine the bending angle of the second finger corresponding to the second sensor group.

Next, in step S513, grouping (by the processor 210 or the processor 310) the first effective sensors into a plurality of first sensor groups respectively corresponding to the first fingers according to the amount of the first fingers and a position order of the first sensors, wherein the amount of the first fingers is equal to the amount of the first sensor groups. Specifically, in another aspect, since the first surface would be touched/covered by multiple fingers corresponding to multiple first sensor groups, the processor 210 or the processor 310 cannot directly group all first effective sensors into only one first sensor group, but the processor 210 or the processor 310 needs to group the first effective sensors on the first surface into multiple first sensor groups, such that the processor 210 or the processor 310 may use the sensing data from each of the first sensor groups to determine the bending angle of each of the first fingers corresponding to the first sensor groups.

Back to FIG. 4A, after the grouping process is complete (S430), next, in step S440, obtaining (by the processor 210 or the processor 310) a bending angle of one finger among the fingers according to the sensing values of the sensing data of all sensors in one sensor group corresponding to the said one finger among the sensor groups. The detail of obtaining the bending angle of each of fingers according to the sensor groups would be explained below.

Figure 6A:
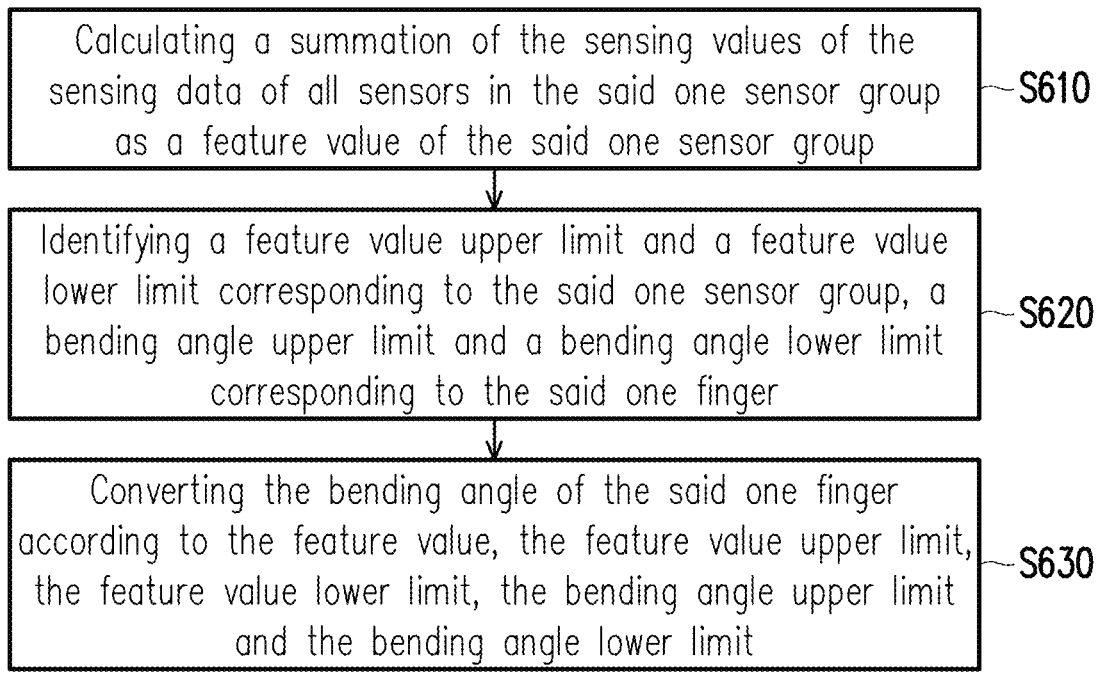
FIG. 6A is a flowchart of obtaining a bending angle of a finger by a plurality of sensing values of sensor group corresponding to the finger according to an embodiment of the invention.

FIG. 6A is a flowchart of obtaining a bending angle of a finger by a plurality of sensing values of sensor group corresponding to the finger according to an embodiment of the invention. Referring to FIG. 6A, in the embodiment, in step S610, calculating (by the processor 210 or the processor 310) a summation of the sensing values of the sensing data of all sensors in the said one sensor group as a feature value of the said one sensor group. In a further embodiment, before calculating the summation of the sensing values of sensors in one sensor group, in response to certain condition is satisfied, the processor 210 or the processor 310 may dynamically adjust one or more specific sensing values corresponding to one or more specific sensors related to the certain condition of the said one sensor group, so as to change the obtained feature value corresponding to the said sensor group. The detail about the dynamically adjustment of the specific sensing values would be explained by FIGS. 10A to 10B.

Next, in step S620, identifying (by the processor 210 or the processor 310) a feature value upper limit and a feature value lower limit corresponding to the said one sensor group, a bending angle upper limit and a bending angle lower limit corresponding to the said one finger. Specifically, regarding one of the fingers, the bending angle upper limit and the bending angle lower limit corresponding to the said one finger would be predetermined, e.g., the bending angle upper limit may be predetermined as 90 degree, and the bending angle lower limit may be predetermined as 0 degree. In the embodiment, when a finger is in a grip status, the bending angle of the finger would reach the bending angle upper limit.

Furthermore, in the embodiment, the feature value upper limit and the feature value lower limit corresponding to one sensor group may be predetermined by experiment or by performing a calibration (also referred to as feature value limit calibration) related to the feature value upper limit and the feature value lower limit of the said one sensor group for current user.

In more detail, the feature value limit calibration performed for each of the sensor groups, for example, includes steps FC1 to FC3 below.

Step FC1: the processor 210 or the processor 310 periodically obtains a plurality of feature values of one sensor group corresponding to one finger during a specific duration, wherein each of the feature values is obtained according to the sensing values of all effective sensors of the said one sensor group each time generated during the specific duration. Specifically, during the specific duration, the user is instructed by the wearable electronic system to use one or more (different) gestures of the hand, and the gestures includes at least one grip gesture (the fingers of the hand would be all in the grip status, e.g., a first state). Furthermore, during the specific duration, the processor 210 or the processor 310 would obtain the feature corresponding to the said one sensor group by the sensing values of the sensors in the said one sensor group periodically (obtain one feature value corresponding to the current sensing values of the sensor group every predetermined time). In another embodiment, the specific duration would be a predetermined period counted in response to sensed that the state of the controller 20 is change to a wearing state from an un-wearing state.

Step FC2: the processor 210 or the processor 310 identifies, during the specific duration, one or more grip feature values which are recorded while the said one finger is determined as being in a grip status among the feature values, and the processor 210 or the processor 310 calculates an average value of the one or more grip feature values as a feature value upper limit corresponding to the said one sensor group. For example, when the user let his/her hand stay in a first state (hand is in the grip status) according to the instruction notified by the wearable electronic system at the specific time during the specific duration, the processor 210 or the processor 310 may determine that the hand and the fingers thereof are in the grip status, and record periodically the feature values of each of the sensor groups as the grip feature values. In another embodiment, the processor 210 or the processor 310 may determine whether the finger corresponding to the said one sensor group is in the grip status according to sub-sensing values of the sub-sensors, corresponding to the tip/follow part of the finger, of the sensors in the said one sensor group, e.g., in response to determining that the one (or the summation) of the sub-sensing values is larger than a grip threshold, the processor 210 or the processor 310 determining that the finger corresponding to the said one sensor group is in the grip status.

Step FC3: the processor selects a minimum feature values among the feature values during the specific duration as a feature value lower limit corresponding to the said one sensor group. Specifically, the processor 210 or the processor 310 keeps updating the minimum (also referred to as the minimum feature value) of the recorded feature values during the specific duration as the feature value lower limit.

Next, in step S630, converting (by the processor 210 or the processor 310) the bending angle of the said one finger according to the feature value, the feature value upper limit, the feature value lower limit, the bending angle upper limit and the bending angle lower limit.

Specifically, in the embodiment, the processor 210 or the processor 310 may generate a mapping table (also referred to as value-to-angle mapping table) according to the feature value upper limit, the feature value lower limit, the bending angle upper limit and the bending angle lower limit, e.g., via corresponding mapping model which indicates the mapping relationship between the feature values and the bending angles. The value-to-angle mapping table may be maintained in the memory 220 (or memory 320), and be stored into the storage circuit unit 230 or the storage circuit unit 330.

Then, the processor 210 or the processor 310 may identifies the bending angle being mapped by the feature value according to the value-to-angle mapping table.

FIG. 6B illustrating mapping tables according to an embodiment of the invention. Referring to FIG. 6B, the value-to-angle mapping table T610 includes a plurality of entries, and each of the entries has two fields of information. First fields of the entries record the predetermined feature values 510(1)-510(Y), and second fields of the entries record the corresponding predetermined bending angles 520(1)-520(Y) mapping to the predetermined feature values 510(1)-510(Y). For example, in responding to determining that the feature value of one sensor group is matching to the predetermined feature value 510(2), the processor 210 or the processor 310 may determining that the predetermined bending angle 520(2) is the bending angle of the finger corresponding to the said one sensor group.

Figure 6C:
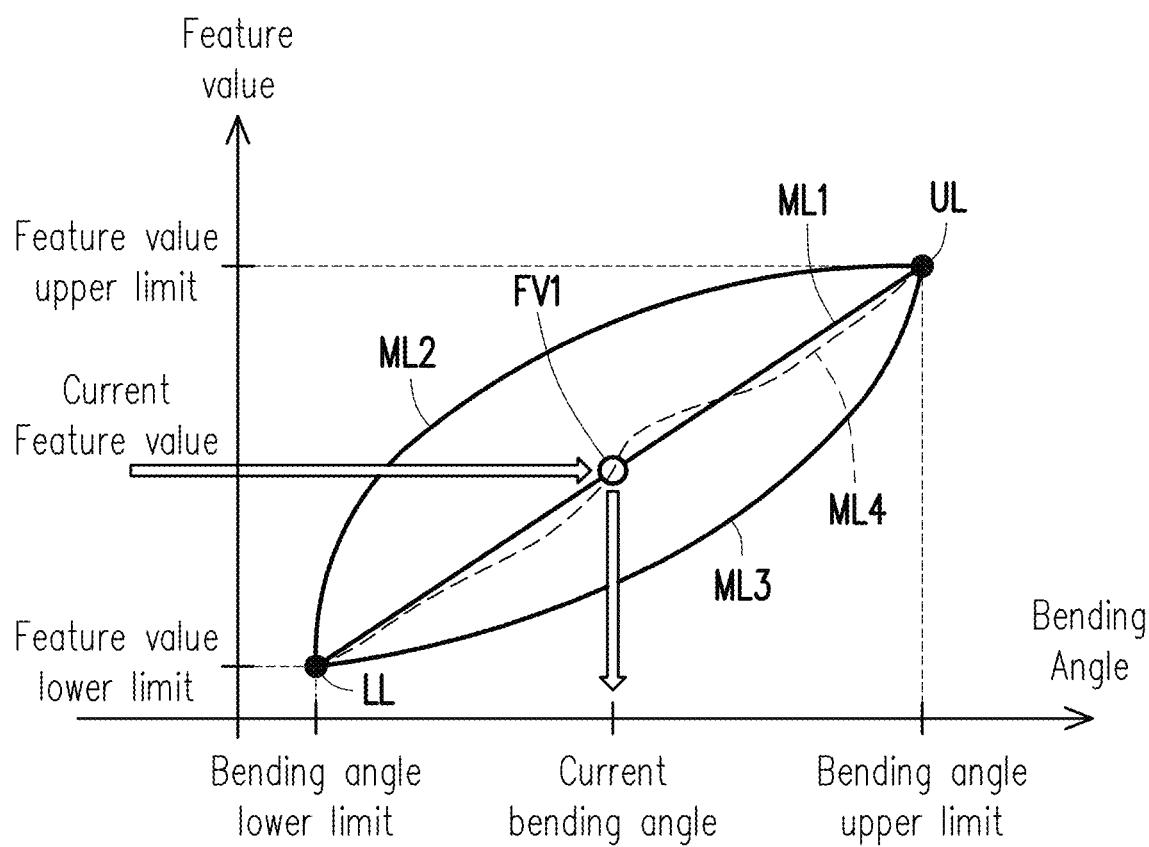
FIG. 6C illustrating a mapping relationship between the feature value and the bending angles according to an embodiment of the invention.

FIG. 6C illustrating a mapping relationship between the feature value and the bending angles according to an embodiment of the invention. Referring to the FIG. 6C, in the embodiment, the mapping model may be implemented as one of the mapping lines ML1 to ML4 in FIG. 6C. More specifically, the endpoint LL of each of the mapping lines ML1 to ML4 indicates the mapping relationship of the feature value lower limit and the bending angle lower limit; the endpoint UL of each of the mapping lines ML1 to ML4 indicates the mapping relationship of the feature value upper limit and the bending angle upper limit; each of the points between the two endpoints LL and UL on each of the mapping lines indicates a mapping relationship of a corresponding feature value and a corresponding bending angle.

For example, it is assumed that the processor 210 or the processor 310 uses the mapping line ML1 as the mapping model. The processor 210 or the processor 310 may input a current feature value of one sensor group corresponding to one finger to the mapping line ML1, so as to obtain/output a current bending angle corresponding to the said one finger. In other words, the current feature value may be converted as the current bending angle via the mapping line ML (mapping model). The invention is not limited by the algorithm or the pattern of the mapping lines of the mapping model.

It should be mentioned, in step S440, the processor 210 or the processor 310 may use another method for obtaining a bending angle according to the corresponding sensing values.

FIG. 7A is a flowchart of obtaining a bending angle by generated waveform according to an embodiment of the invention. Referring to FIG. 7A, in step S710, Generating a pulse waveform according to the sensors in the said one sensor group and the sensing values of the sensors in the said one sensor group, wherein the pulse waveform comprises a plurality of pulses, and the pulses represents the sensing values of the sensors, wherein an order of the pulses in the pulse waveform is corresponding to an position order of the sensors.

Figure 7B:
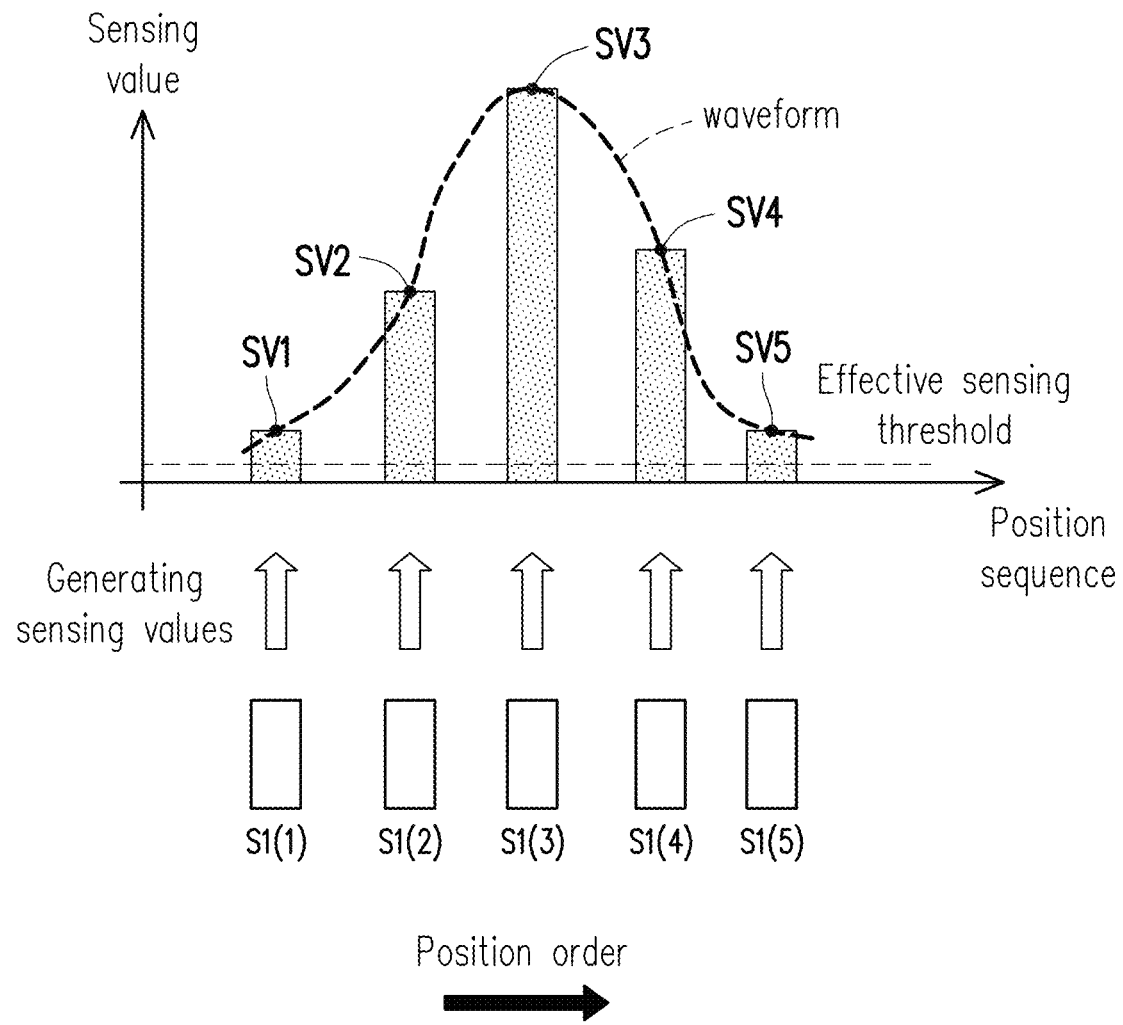
FIG. 7B is a schematic diagram illustrating a sensing value waveform of sensors according to an embodiment of the invention.

FIG. 7B is a schematic diagram illustrating a sensing value waveform of sensors according to an embodiment of the invention. Referring FIG. 7B, it is assumed that effective sensors S1(1) to S1(5) (e.g., among the sensors S1(1) to S1(N) in FIG. 2B) are grouped into one sensor group corresponding to one finger, the processor 210 or the processor 310 obtains the sensing values SV1 to SV5 generated by the effective sensors S1(1) to S1(5), and the processor 210 or the processor 310 may illustrate or identify a waveform (also referred to as the sensing value waveform or pulse waveform) by the sensing values SV1 to SV5 corresponding to the effective sensors S1(1) to S1(5) and the position sequence of the effective sensors S1(1) to S1(5) (e.g., as illustrated in FIG. 2B, sensors S1(1) is arranged before the sensor S1(2)).

It should be noted that the pulse waveform may include a plurality of pulses, a curve connecting the ends of the pulses, or the combination thereof, and the invention is not limited thereto. The width of each of the pulses is preset, the interval between two pulses is preset, and the invention is not limited hereto.

After the pulse waveform is generated, in step S720, the processor 210 or the processor 310 identifies a plurality of predetermined pulse waveforms and a plurality of predetermined bending angles respectively corresponding to the predetermined pulse waveforms. Next, in step S730, the processor 210 or the processor 310 identifies the bending angle of the said one finger according to the generated pulse waveform, the predetermined pulse waveforms and the predetermined bending angles.

In more detail, in the operation of identifying the bending angle of the said one finger according to the generated pulse waveform, the predetermined pulse waveforms and the predetermined bending angles, the processor 210 or the processor 310 identifies a target predetermined pulse waveform among the predetermined pulse waveforms by comparing the generated pulse waveform with the predetermined pulse waveforms, and identifies, among the predetermined bending angles, a target predetermined bending angle corresponding to the target predetermined pulse waveform as the bending angle of the said one finger.

Figure 7C:
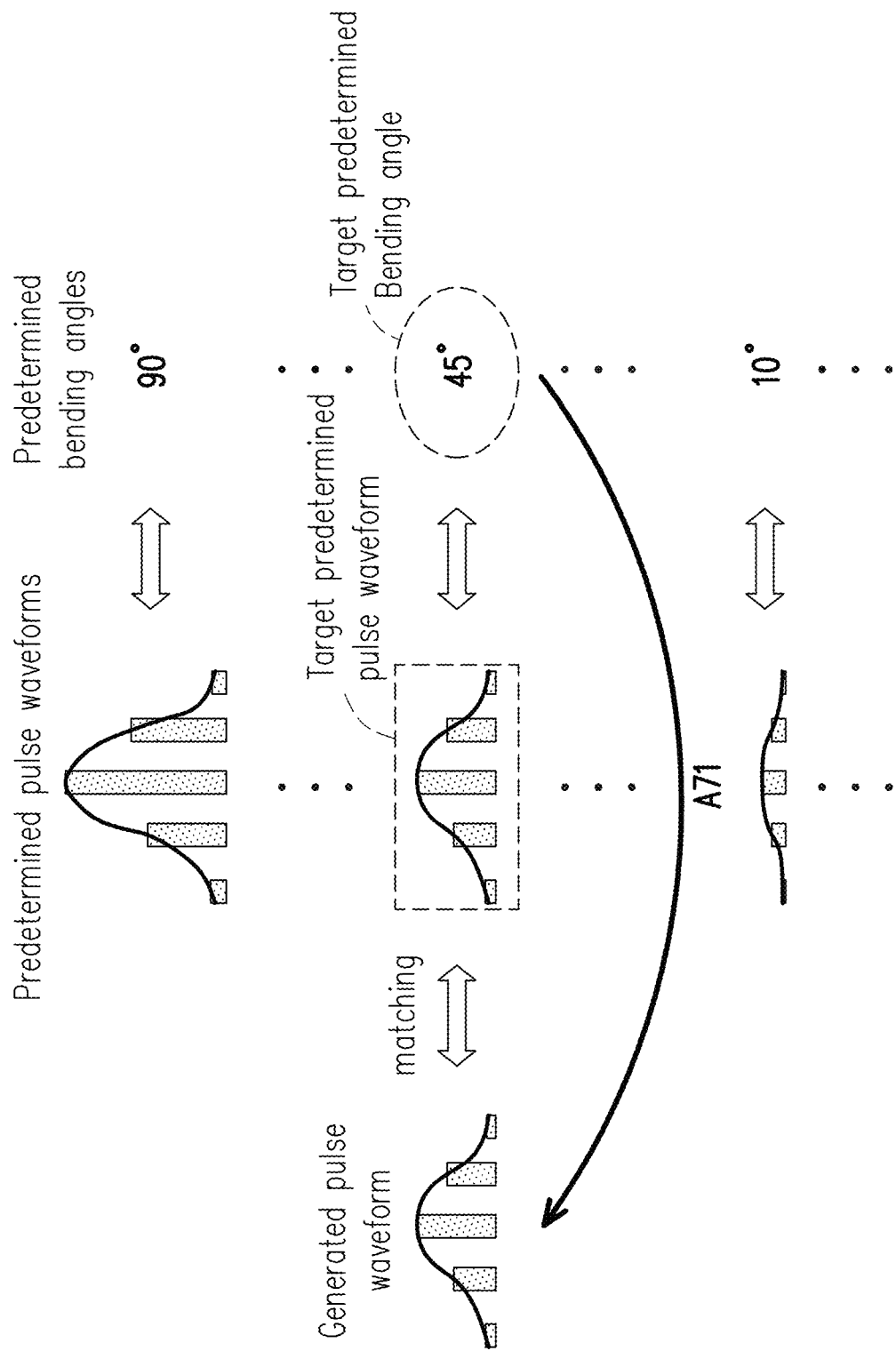
FIG. 7C is a schematic diagram of obtaining a bending angle by generated waveform illustrated according to an embodiment of the invention.

FIG. 7C is a schematic diagram of obtaining a bending angle by generated waveform illustrated according to an embodiment of the invention. Referring to FIG. 7C, it is assumed that the processor 210 or the processor 310 identifies a plurality of predetermined pulse waveforms and a plurality of predetermined bending angles corresponding to the predetermined pulse waveforms. Furthermore, for different fingers, the set of predetermined pulse waveforms and the predetermined bending angles corresponding the fingers would be different. As illustrated by arrow A71, the processor 210 or the processor 310 may find the target predetermined bending angle corresponding to the target predetermined pulse waveform which is matching to the generated pulse waveform.

Figure 7D:
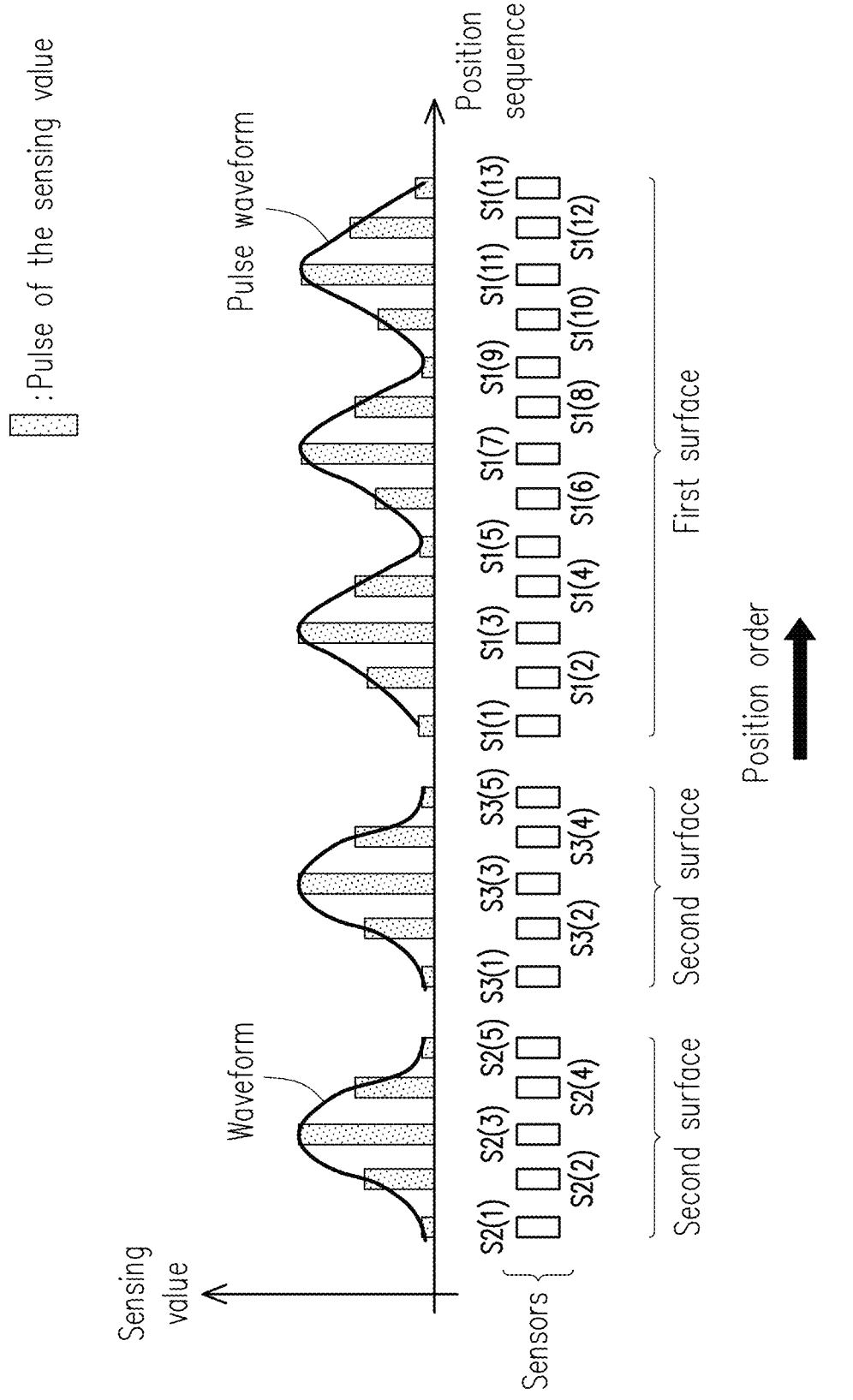
FIG. 7D is a schematic diagram illustrating sensing value waveforms of sensor groups disposed on surfaces of the controller according to an embodiment of the invention.

FIG. 7D is a schematic diagram illustrating sensing value waveforms of sensor groups disposed on surfaces of the controller according to an embodiment of the invention. Referring to FIGS. 2B and 7D, it is assumed that the effective sensors S1(1) to S1(13) disposed on the first surface SP1 and SP2 as the first effective sensors (assuming that N is 13); the effective sensors S3(1) to S3(2) disposed on the second surface SP3 as the second effective sensors; and the effective sensors S2(1) to S2(2) disposed on the second surface SP5 as the other second effective sensors. For example, the pulse waveforms generated according to the sensing values of the sensors S1(1) to S1(13), S3(1) to S3(2) and S2(1) to S2(2) are illustrated in FIG. 7D. It should be noted, in an embodiment, according to the amount of peaks of the pulse waveforms related to each of the first surface and second surfaces, the processor may identify that the amount of finger touched/covered each of the second surfaces is 1 (e.g., the pulse waveform corresponding to each of the second surface has one peak), and the amount of fingers currently touched/covered the first surfaces is 3 (e.g., the pulse waveform corresponding to the first surface has three peaks).

In another aspect, as mentioned above, the first surface is predetermined as being touched/covered by a plurality of fingers (also referred to as first fingers), and the processor 210 or the processor 310 initially groups the first effective sensors on the first surfaces into sensor groups corresponding to the first fingers. In more detail, in the operation of initial grouping for the first effective sensors on the first surface, the processor 210 or the processor 310 initially selects front P first effective sensors among the first effective sensors, and groups the front P first effective sensors into a front first sensor group corresponding to a front first finger according to the position order among the first sensor group, and initially selects the back P first effective sensors among the first effective sensors, and groups the back P first effective sensors into a back first sensor group corresponding to a back first finger according to the position order among the first sensor group, wherein P is determined by dividing the amount of the first effective sensors with the amount of the first fingers (e.g., P is the quotient calculated by dividing the amount of the first effective sensors with the amount of the first fingers). Furthermore, in response to one or more remaining first sensor groups among the first sensor groups not being grouped, the processor 210 or the processor 310 initially groups the remaining first effective sensors among the first effective sensors into the one or more remaining first sensor group.

In other words, via the foregoing initial grouping procedure, the processor 210 or the processor 310 may near evenly distribute the first effective sensors into the first sensor groups.

For example, referring to FIG. 7D, it is assumed that the first effective sensors on the first surface is sensors S1(1) to S1(13), the amounts of the first fingers and first sensor groups corresponding to the first surface are both predetermined as 3, and P is determined as 4 (e.g., the quotient of 13/3 is 4). The processor 210 or the processor 310 may group the front 4 first effective sensors S1(1) to S1(4) into a front first sensor group, and group the back 4 first effective sensors S1(10) to S1(13) into a back first sensor group. Since the amount of all first sensor groups is three and two first sensor groups are grouped by first effective sensors S1(1) to S1(4) and S1(10) to S1(13), the processor 210 or the processor 310 may identify that one first sensor group is not grouped. Then, the processor 210 or the processor 310 group the remaining first effective sensors S1(5) to S1(9) into the remaining one first sensor group, and the initial grouping for the first effective sensors S1(1) to S1(13) on the first surface is completed.

In the embodiment, the processor 210 or the processor 310 may perform a sensor grouping calibration in the background to periodically re-identify the effective sensors and re-group the first effective sensors (the effective sensors on a first surface) among the re-identified effective sensors into the first sensor groups according to the sensing values of the first effective sensors. It should be noted that, in response to determining that the amount of all the effective sensors is changed to zero, the processor 210 or the processor 310 determining that the controller is not worn/fastened on a hand of a user (e.g., the state of the controller 20 is change to an un-wearing state from a wearing state). Then, in response to determining that the amount of all the effective sensors is changed to an positive integer from zero, the processor 210 or the processor 310 determining that the controller is worn/fastened on the hand of the user (e.g., the state of the controller 20 is change to the wearing state from the un-wearing state), and start to perform the initial grouping procedure.

In another embodiment, the processor 210 or the processor 310 does not perform the initial grouping procedure, but performs the sensor grouping calibration in the background periodically in response to determining that the controller 20 is in the wearing state.

Furthermore, in a further embodiment, during the sensor grouping calibration, the processor 210 or the processor 310 may re-grouping first effective sensors on a first surface into the corresponding first sensor groups according to the sensing values generated by the first effective sensors. For example, it is assumed that the processor 210 or the processor 310 generates the pulse waveform of the first effective sensors S1(1) to S1(13) as illustrated in FIG. 7D. During the sensor grouping calibration, the processor 210 or the processor 310 may re-groups the first effective sensors S1(1) to S1(13) into three first sensor groups according to the generated pulse waveform and the position order of the first effective sensors S1(1) to S1(13), e.g., the first effective sensors S1(1) to S1(4) under the first one wave of the pulse waveform is grouped into a first sensor group corresponding to the first one finger among the fingers corresponding to the first surface, the first effective sensors S1(10) to S1(13) under the last one wave of the pulse waveform is grouped into a first sensor group corresponding to the last one finger among the fingers corresponding to the first surface, and the first effective sensors S1(5) to S1(9) in the middle one wave of the pulse waveform is grouped into a first sensor group corresponding to the middle one finger among the fingers corresponding to the first surface.

It should be mentioned, in an embodiment, the processor 210 or the processor 310 may determine a mapping relationship (or a mapping model) between a plurality of predetermined gestures of a hand and corresponding predetermined pulse waveforms of all the fingers of the hand in a manner of machine learning. Each of the predetermined pulse waveforms is combined by the pulse waveform of each of the fingers of the hand, e.g., one predetermined pulse waveform is corresponding to whole fingers of the hand. In a further embodiment, the wearable electronic system 1 may determine a gesture of a hand by performing an image recognition on an image of the hand having that gesture captured by the image capture device 350 of wearable electronic device 30, and the wearable electronic system 1 may map the generated pulse waveform of the hand at that moment to that gesture.

Figure 8:
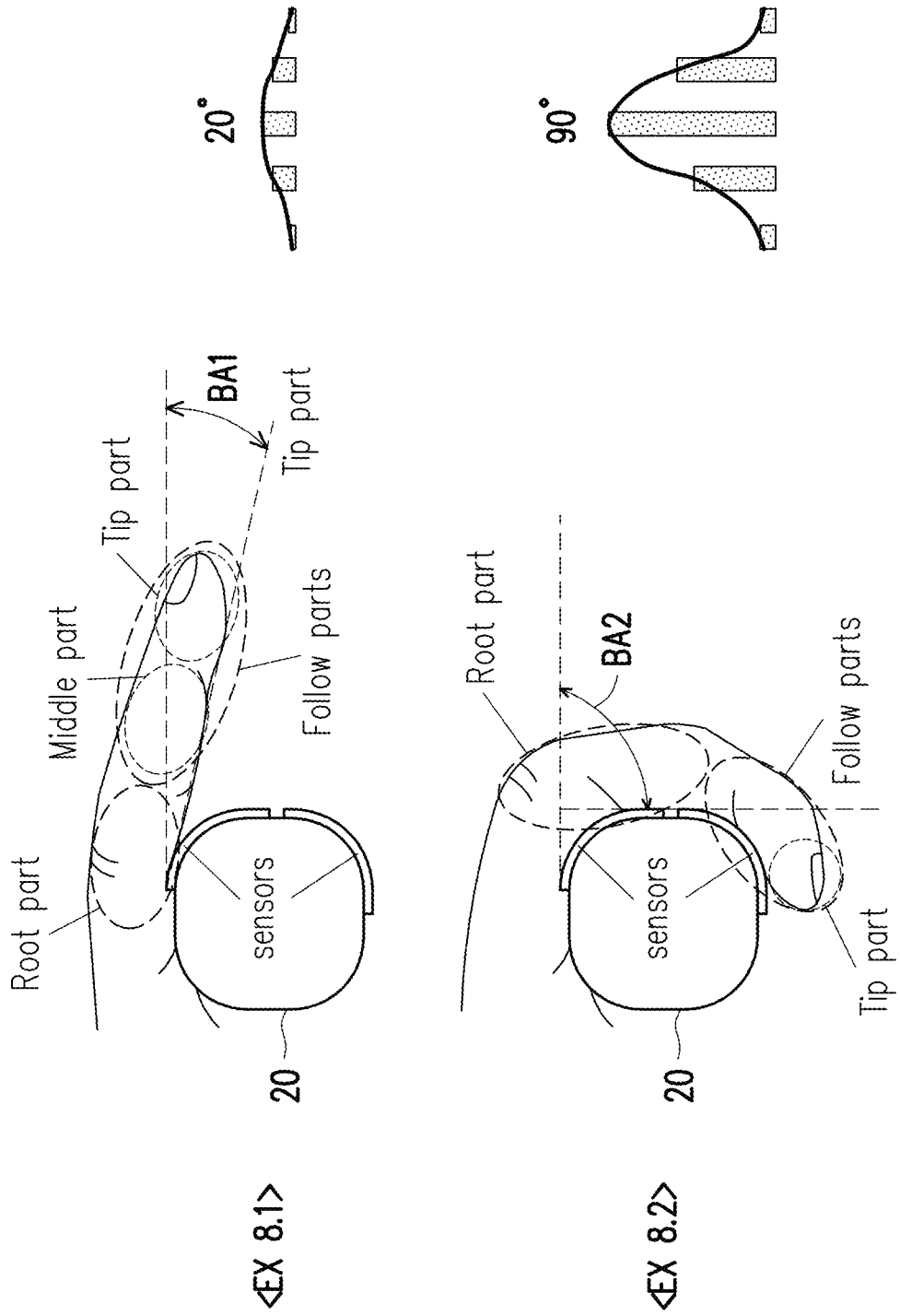
FIG. 8 is a schematic diagram illustrating bended finger on the controller and corresponding bending angles according to an embodiment of the invention.

FIG. 8 is a schematic diagram illustrating bended finger on the controller and corresponding bending angles according to an embodiment of the invention. Referring to FIG. 8, in the examples <EX 8.1> and <EX 8.2>, each finger includes a root part and a follow part. The follow part may include a middle part and a tip part. The follow part of the thumb only includes the tip part. It should be noted that the schematic diagram of FIG. 8 is, for example, a view illustrated from the down side of the controller 20 in FIG. 2A to 2C.

Furthermore, the obtained bending angle corresponding to the finger indicates an angle between the root part of the finger and the stretch line of the palm, such as the bending angle BA1 (e.g., 20 degrees) in <EX 8.1> and the bending angle BA2 (e.g., 90 degrees) in <EX 8.2>. Moreover, as illustrated in example <EX 8.2>, the finger grasping the controller 20 is in the grip status, and the bending angle of the finger in the grip status is preset as 90 degrees (e.g., maximum bending angle).

Referring back to FIG. 4A, after obtaining the bending angle, in step S450, instructing (by the processor 310) a display device 410 of the wearable electronic device 30 to render a virtual hand having a plurality of virtual fingers corresponding to the fingers into a virtual space corresponding to the wearable electronic device 30 (as illustrated in FIG. 1A, the virtual hand V10 in the virtual scene). Next, in step S460, bending (by the processor 310) one virtual finger corresponding to the said one finger among the virtual fingers according to the obtained bending angle of the said one finger, so as to render the virtual hand having a gesture matching to a gesture of the hand sensed by the controller.

Figure 9A:
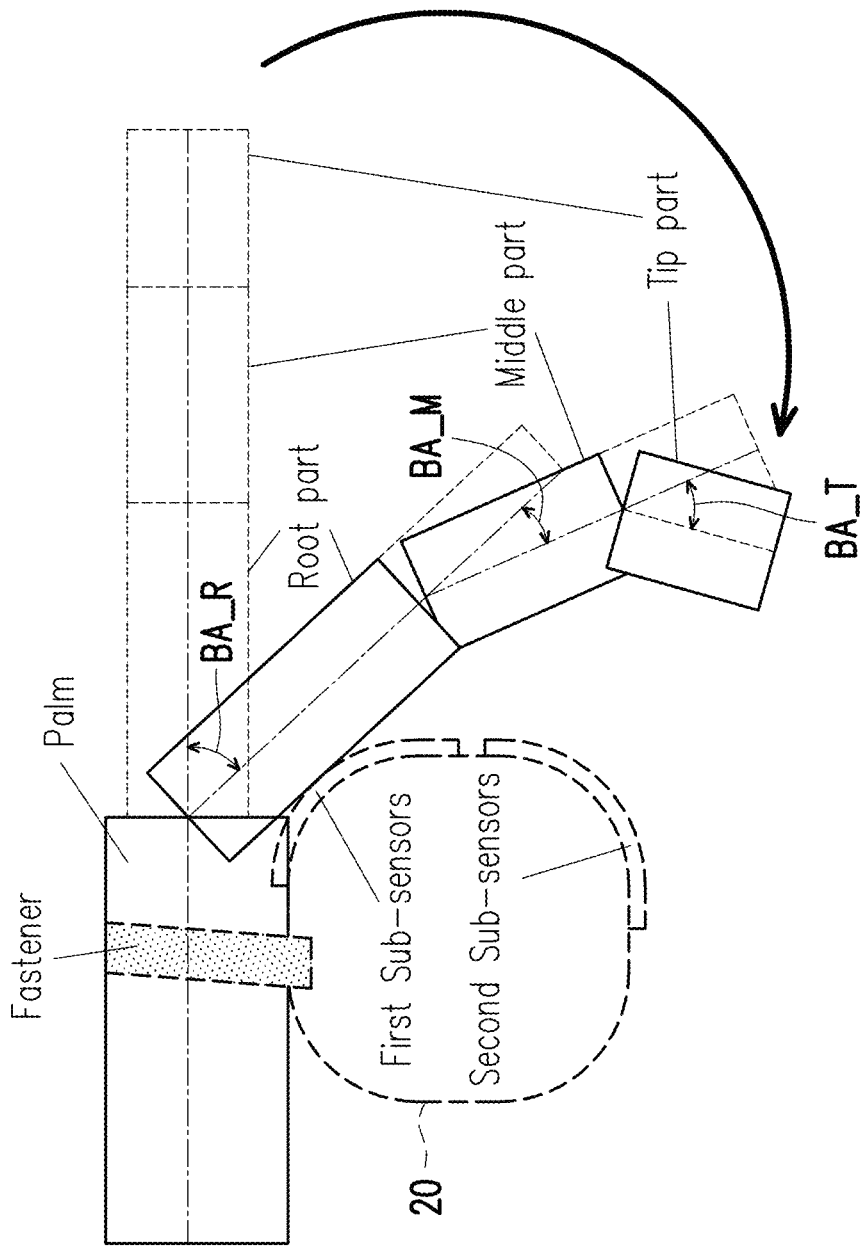
FIG. 9A is a schematic diagram illustrating bending angles of different parts of a finger/virtual finger according to an embodiment of the invention.

FIG. 9A is a schematic diagram illustrating bending angles of different parts of a finger/virtual finger according to an embodiment of the invention. Referring to FIG. 9A, in the embodiment, each of the virtual fingers of the virtual hand has one root part connecting to a virtual palm of the virtual hand and one or more follow parts connecting to the root part, wherein the virtual palm, the root parts and the follow parts of the virtual fingers respectively corresponds to a palm of the hand, root parts and follow parts of the fingers.

In the operation of bending the said one virtual finger corresponding to the said one finger among the virtual fingers according to the obtained bending angle of the said one finger, the processor 310 bends the root part of the said one virtual finger by the obtained bending angle BA_R.

Then, the processor 310 bends the one or more follow parts (as illustrated in FIG. 9A, follow parts includes a middle part and a tip part) according to one or more follow bending angles corresponding to the one or more follow parts (e.g., the follow bending angle BA_M corresponding to the middle part and the follow bending angle BA_T corresponding to the tip part). For example, after bending the root part of the virtual finger by the bending angle BA_R, the processor 310 further bends the middle part of the virtual finger by the follow bending angle BA_M, and then processor 310 further bends the tip part of the virtual finger by the follow bending angle BA_T.

In the embodiment, the one or more follow bending angles are determined, by the processor 310, according to the obtained bending angle by looking up a bending-angle mapping table which records a plurality of basic bending angles corresponding to the root part of each of the virtual fingers and one or more follow bending angles mapping to the basic bending angle. For example, the bending-angle mapping table of one finger may record a plurality of entries, each of the entries records a bending angle of the root part, and one or more follow bending angles respectively corresponding to one or more follow parts of that finger (depend on the amount of the follow parts) mapping to the bending angle of the root part. The larger bending angle of the root part is mapped by the larger follow bending angles (e.g., bending angle BA_R "90 degree" may be mapped by a follow bending angle BA_M "45 degree" and another follow bending angle BA_T "45 degree"; bending angle BA_R "0 degree" may be mapped by a follow bending angle BA_M "0 degree" and another follow bending angle BA_T "0 degree"). The contents of the entries of the bending-angle mapping table are predetermined by experiment.

In the embodiment, the sensing value of each of the sensors is generated by a first sub-sensing value provided by a first sub-sensor among the sub-sensors and one or more second sub-sensing values provided by one or more second sub-sensors among the sub-sensors according to a first weight value corresponding to the first sub-sensor and one or more second weight values corresponding to the one or more second sub-sensors, wherein the first sub-sensors of the sensors are corresponding to the root parts of the fingers, and the second sub-sensors are corresponding to the follow parts of the fingers. The values of the first weight value corresponding to the first sub-sensor and the one or more second weight values corresponding to the one or more second sub-sensors may be predetermined according to the actual needs.

Figure 9B:
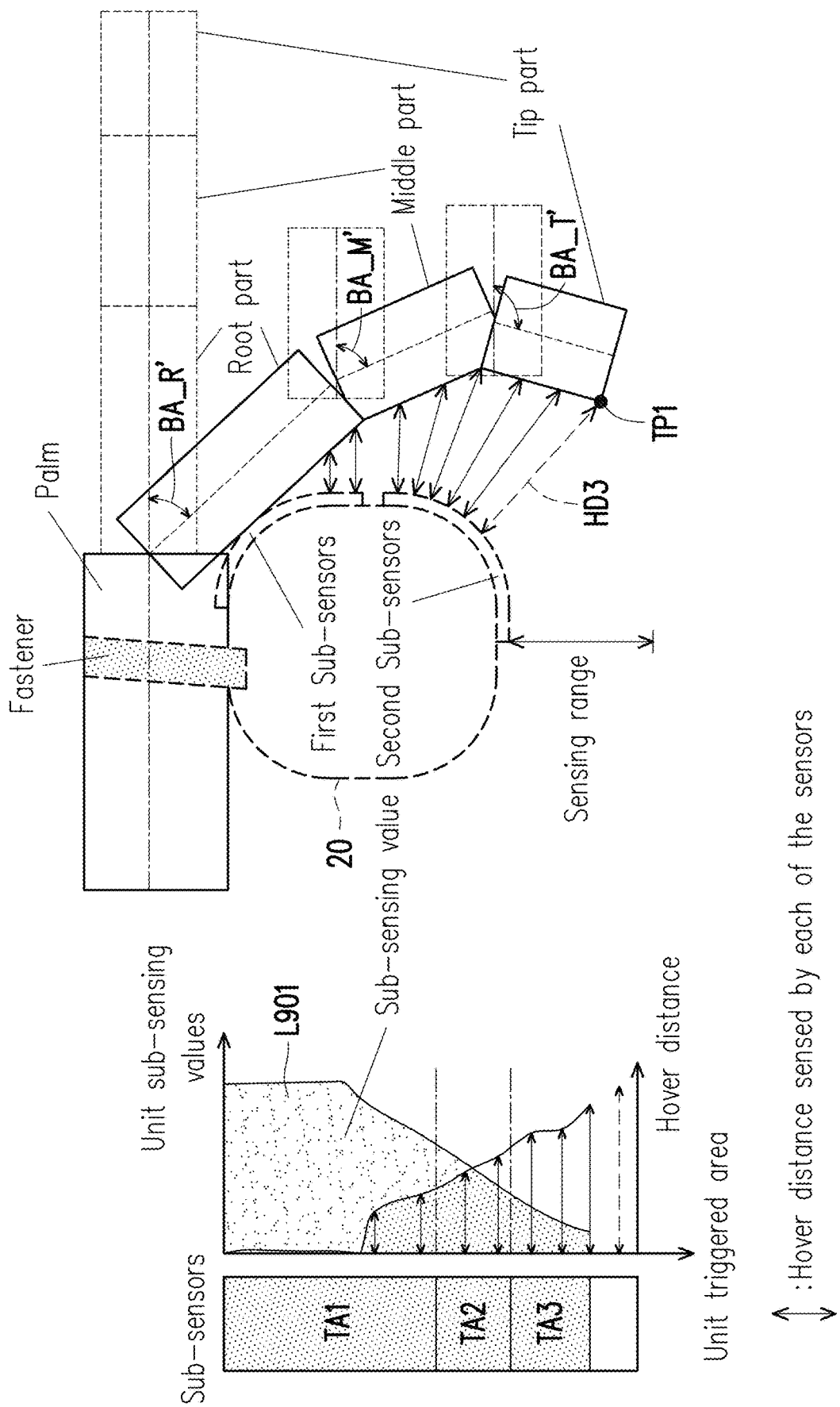
FIG. 9B is a schematic diagram illustrating bending angles of different parts of a finger/virtual finger according to a further embodiment of the invention.

FIG. 9B is a schematic diagram illustrating bending angles of different parts of a finger/virtual finger according to a further embodiment of the invention. Referring the FIG. 9B, in this embodiment, the bending angles BA_R', BA_M' and BA_T' of parts of the finger may be obtained according to the sensing values related to the triggered areas and hover distances (within the sensing range) corresponding to the parts. Furthermore, as illustrated by FIG. 9B, sensor corresponding to the finger includes a first sub-sensor corresponding to the root part of the finger, and a second sub-sensor corresponding to the follow parts of the finger.

Specifically, as mentioned above, the sensing value of each of the sensors may be generated according to the triggered area and the hover distances related to the triggered area. For example, referring to the schematic diagram illustrated on the left side of FIG. 9B, it is assumed that the triggered area TA1 corresponding to the root part, the triggered area TA2 corresponding to the middle part and the triggered area TA3 corresponding to the tip part are identified, and the hover distances within the sensing range are also identified by the sub-sensors (the values of the first and second weight values are predetermined as 1). The sub-sensors would generate corresponding sub-sensing values of each triggered areas TA1 to TA3 according to the sensed hover distances between the parts and the surface of the sub-sensors. The unit sub-sensing value of each unit triggered area may be combined as the curve L901, and the sub-sensing value of each of the triggered areas may be obtained via the size of the area under the curve L901 (the total area under the curve L901 may be referred to as the sensing value of the sensor, e.g., the sensing value is the summation of the sub-sensing values). In other words, in this example, the processor 210 or the processor 310 may obtain a sub-sensing value corresponding to the triggered area TA1 according to the area size of the triggered area TA1 and the hover distances related to the triggered area TA1, another sub-sensing value corresponding to the triggered area TA2 according to the area size of the triggered area TA2 and the hover distances related to the triggered area TA2, and another sub-sensing value corresponding to the triggered area TA3 according to the area size of the triggered area TA3 and the hover distances related to the triggered area TA3. Then, the processor 210 or the processor 310 may obtain the bending angle BA_R' of the root part by the sub-sensing value corresponding to the triggered area TA1, obtain the follow bending angle BA_M' of the middle part by the sub-sensing value corresponding to the triggered area TA2, and obtain the follow bending angle BA_T' of the tip part by the sub-sensing value corresponding to the triggered area TA3. Then, the processor 310 may determine to bend the parts of the virtual fingers according to the bending angles. For example, the processor 310 may perform a bending operation of the parts of the virtual fingers via the display device 410 according to the bending angles. In the bending operation, the processor 310 transmits the image content data of the parts of the virtual fingers with sequential different position according to the bending angles to the display device 410, such that the display device renders the parts of the virtual fingers which bend from a previously bending angels to the currently obtained bending angles. The method for obtaining the bending angles is explain in the foregoing embodiments, the detail would be omitted.

Parts or all of the steps of whole procedure indicated in FIG. 4A would be periodically performed by the processor 210 or/and processor 310, so as to keep updating the gesture of the virtual hand and the virtual fingers with the gesture of the hand and the fingers wearing (or attaching/holding) the controller 20.

When an adjacent finger of one finger is bended, the sensing value of the said one finger may be affected because the bended adjacent finger may sometimes drive the said one finger to bend unintentionally according to the nature physiological motion mechanism of the fingers of a hand. Therefore, in the embodiment, for solving this problem, the processor 210 or the processor 310 may dynamically adjust the feature value of one or more sensor groups.

More specifically, in response to determining that one finger is bending (e.g., the bending angle of the said one finger is not zero), the processor 210 or the processor 310 identifies one adjacent finger corresponding to the said one finger to which one sensor group corresponds and obtains a further feature value corresponding to the said one adjacent finger. The said one adjacent finger is disposed next to the said one finger on the same surface.

Then, in response to determining that the further feature value is larger than an adjusting threshold, the processor 210 or the processor 310 adjusts a target sensing value generated by a target effective sensor among the effective sensors in the said one sensor group corresponding to the said one finger, so as to adjust the obtained feature value corresponding to the said one finger to which the said one sensor group corresponds.

It should be noted that, the target effective sensor includes the sensor closed to the said one adjacent finger, a further sensor away the said one adjacent finger, or the combination thereof. The detail would be explained by FIG. 10A and FIG. 10B below.

Figure 10A:
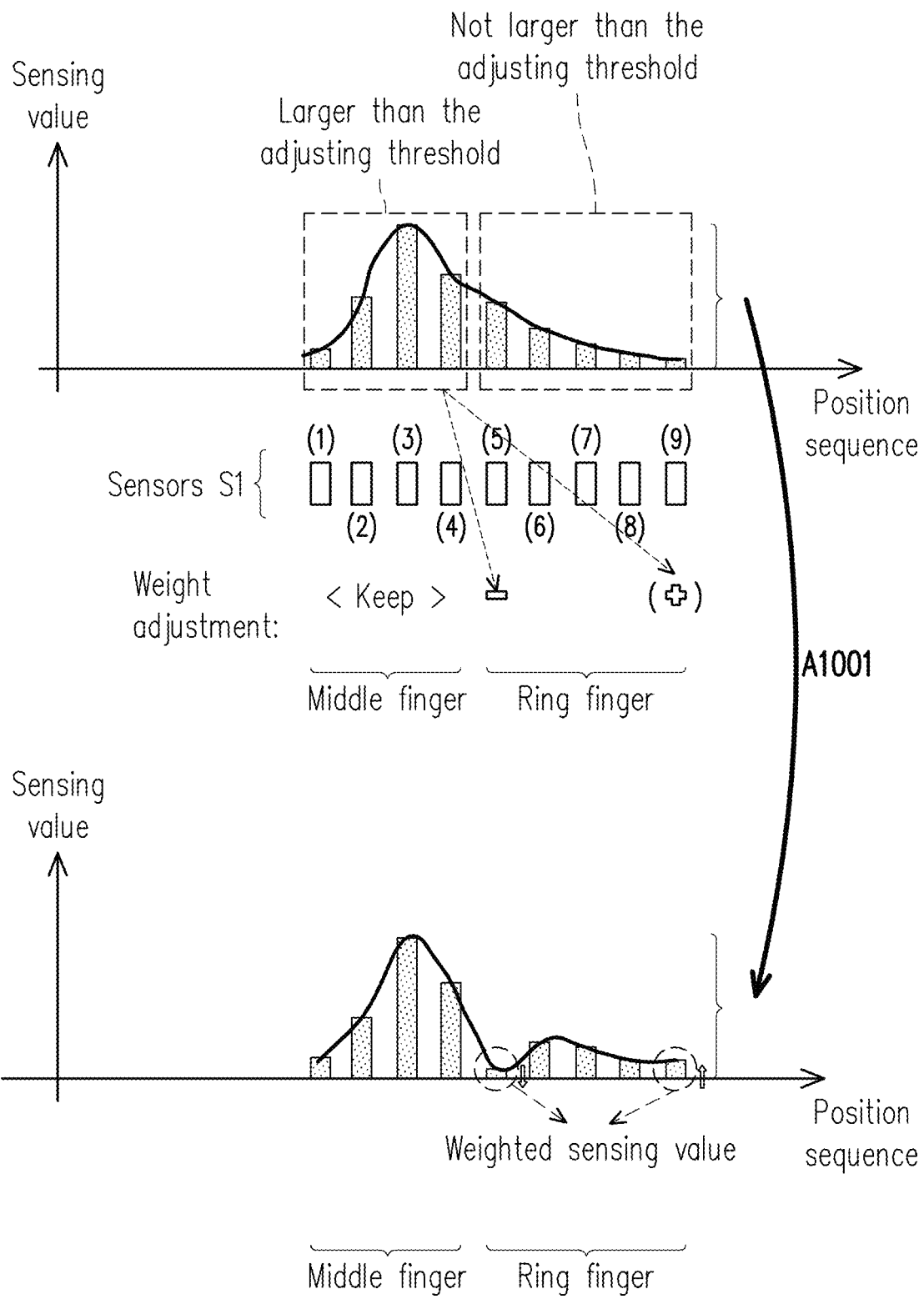
FIG. 10A is a schematic diagram of dynamically adjusting the weight corresponding to sensing values of sensors by adjusting threshold according to an embodiment of the invention.
Figure 10B:
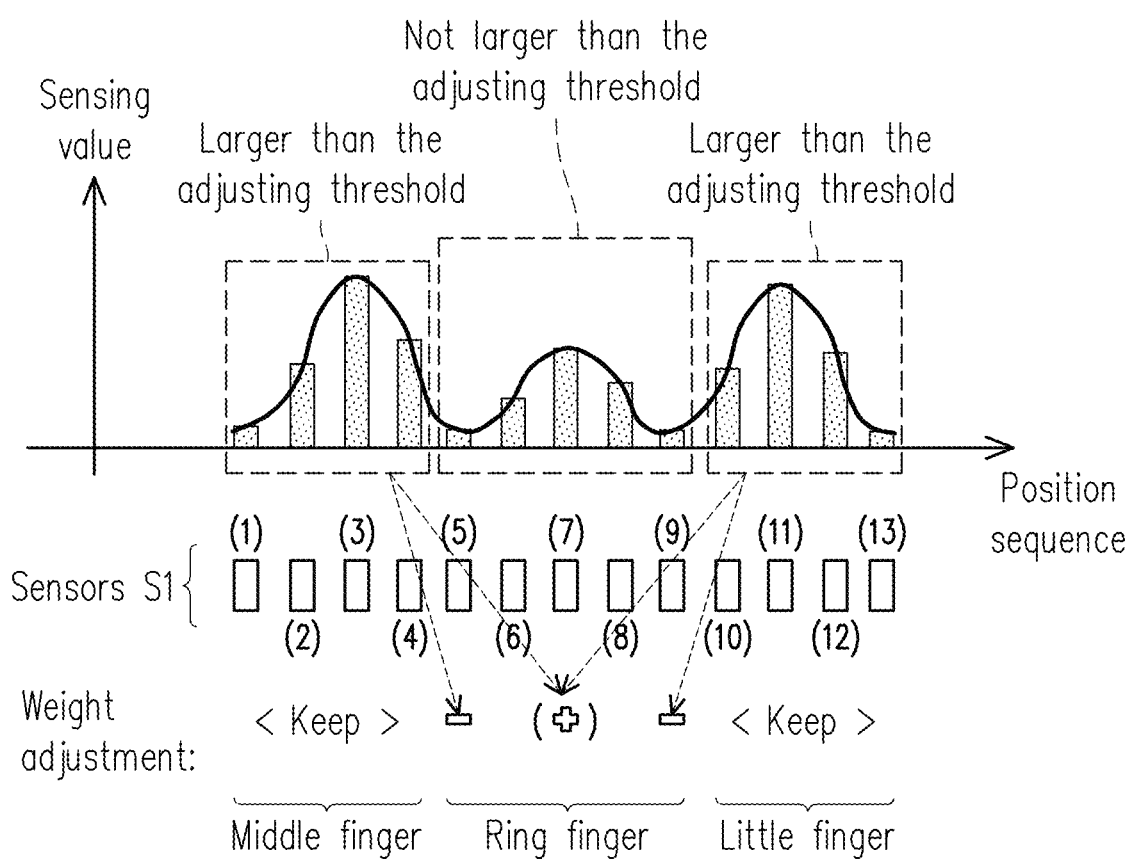
FIG. 10B is a schematic diagram of dynamically adjusting the weight corresponding to sensing values of sensors by adjusting threshold according to a further embodiment of the invention.

FIG. 10A is a schematic diagram of dynamically adjusting the weight corresponding to sensing values of sensors by an adjusting threshold according to an embodiment of the invention. FIG. 10B is a schematic diagram of dynamically adjusting the weight corresponding to sensing values of sensors by an adjusting threshold according to a further embodiment of the invention. It should be mentioned that the adjusting threshold is used for determining whether an adjacent finger of one finger may affect the said one finger by comparing the feature value of the adjacent finger with the adjusting threshold, and the weight adjustment of the said one finger would be performed or not according to the determination/comparison result.

For example, referring to FIG. 10A, it is assumed that only the middle finger is bended by the user, the pulse waveform of the effective sensors S1(1) to S1(9) is generated, wherein the effective sensors S1(1) to S1(4) are grouped into one sensor group corresponding to the middle finger, and the effective sensors S1(5) to S1(9) are grouped into one further sensor group corresponding to the ring finger. Furthermore, the processor 210 or the processor 310 obtains a feature value corresponding to the ring finger according to the sensing values generated by effective sensors S1(5) to S1(9), and obtains a further feature value corresponding to the middle finger (which is the adjacent finger corresponding to the ring finger) according to the sensing values generated by effective sensors S1(1) to S1(4). Moreover, in this example, the processor 210 or the processor 310 calculates a weighted sensing value of a sensor by multiplying a weight value corresponding to the sensor with a sensing value generated by the sensor. The weight value may be predetermined as 1. After obtaining the weighted sensing values of all effective sensors in one sensor group, the processor 210 or the processor 310 may calculate a summation of the weighted sensing values as the feature value of the corresponding sensor group, and the calculated feature value is corresponding to the finger related to the sensor group. Furthermore, the corresponding pulse waveform is generated according to the weighted sensing values.

In this example, the processor 210 or the processor 310 determines that the ring finger is bending according to the feature value of the ring finger (although only the middle finger is bended actually, the processor 210 or the processor 310 still determines all the two fingers are both bended according to the feature values (without performing the weight adjustment) of the two fingers), and further determines that the further feature value of the middle finger is larger than the adjusting threshold. Then, since the further feature value of the middle finger is determined as being larger than the adjusting threshold, the processor 210 or the processor 310 identifies that the bending of the middle finger would affect a target effective sensor closed to the middle finger among the effective sensors corresponding to the ring finger. Therefore, the processor 210 or the processor 310 may decrease the weighted sensing value corresponding to the target effective sensor (e.g., effective sensor S1(5)) by decreasing the weight value corresponding to the target effective sensor (as the "−" of the weight adjustment illustrated in FIG. 10A). Furthermore, the processor 210 or the processor 310 may further increase the weighted sensing value corresponding to a further target effective sensor (which is one effective sensor away the middle finger, e.g., the effective sensor S1(9)) by increasing the weight value corresponding to the further target effective sensor (as the "+" of the weight adjustment illustrated in FIG. 10A), such that the final adjusted feature value would not be decreased too much by the weight adjustment related to the target effective sensor S1(5). In another aspect, regarding the weight adjustment related to the effective sensors S1(1) to S1(4) corresponding to the middle finger, since the feature value of the ring finger is not larger than the adjusting threshold, the weight values corresponding to the effective sensors S1(1) to S1(4) are kept (not changed).

As illustrated by arrow A1001, after dynamically adjusting the feature value of the ring finger in response to determining that the further feature value larger than the adjusting threshold, the adjusted pulse waveform corresponding to the middle finger and the ring finger is generated according to the adjusted weighted sensing values.

For another example, referring to FIG. 10B, it is assumed that only the middle finger and the little finger are bended by the user, the pulse waveform of the effective sensors S1(1) to S1(13) is generated, the sensor group corresponding to the middle finger includes the effective sensors S1(1) to S1(4), the sensor group corresponding to the ring finger includes the effective sensors S1(5) to S1(9), and the sensor group corresponding to the little finger includes the effective sensors S1(10) to S1(13). Furthermore, the processor 210 or the processor 310 determines that the feature value of the middle finger is larger than the adjusting threshold, the feature value of the ring finger is not larger than the adjusting threshold, and the feature value of the little finger is larger than the adjusting threshold. It should be noted that, although only the middle finger and the little finger are bended actually, the processor 210 or the processor 310 still determines all the three fingers are bended according to the feature values (without performing the weight adjustment) of the three fingers.

As the processes explained above, in this example, regarding the ring finger, since the feature values of the adjacent fingers (i.e., middle finger and little finger) of the ring finger are both determined as larger than the adjusting threshold, the processor 210 or the processor 310 may decrease the weight value corresponding to the effective sensor S1(5) closed to the middle finger, and decrease the weight value corresponding to the effective sensor S1(9)

closed to the little finger as illustrated by arrows in FIG. 10B. Furthermore, the processor 210 or the processor 310 may further increase the weight value corresponding to the effective sensor S1(7) which is away from the middle finger and the little finger. In another aspect, since the feature value of the ring finger (the adjacent finger of the middle finger and the little finger) is not larger than the adjusting threshold, the processor 210 or the processor 310 would not adjust the weight values corresponding to the effective sensors related to the middle finger and the little fingers (e.g., the effective sensors S1(1) to S1(4) and S1(10) to S1(13)).

In the embodiment, in certain condition, the sensors/sub-sensors corresponding to one finger are unintentionally touched by an adjacent finger of the said one finger, the corresponding one or more sensing value are determined as larger than the grip threshold, such that the said one finger would be wrongly determined as being in the grip status. For solving this problem, a method is provided by an embodiment of the invention, which includes the following steps (assuming that the sensor corresponding to each of the fingers includes a first sub-sensor group corresponding to the root part of a finger and a second sub-sensor group corresponding to the follow part of a finger):

First, the processor 210 or the processor 310 calculates a first feature value corresponding to one first sub-sensor group corresponding to the root part of one finger according to the first sub-sensing values of the first sub-sensors in the said one first sub-sensor group, and calculates a second feature value corresponding to one second sub-sensor group corresponding to the follow parts of the said one finger according to the second sub-sensing values of the second sub-sensors in the said one second sub-sensor group.

Then, in response to determining that the calculated second feature value is larger than a grip threshold, the processor 210 or the processor 310 determines whether the calculated first feature value is larger than a further grip threshold.

Then, in response to determining that the calculated first feature value is larger than a further grip threshold, the processor 210 or the processor 310 determines that the said one finger has a maximum bending angle or the said one finger is in a grip status.

On the other hand, in response to determining that the first feature value is not larger than the further grip threshold, the processor 210 or the processor 310 determines/confirms that the said one finger is not in the grip status.

In an embodiment, in response to determining that the said one finger is not in the grip status by determining that the second feature value corresponding to the said one finger is larger than the grip threshold and the first feature value corresponding to the said one finger is not larger than the further grip threshold, the processor 210 or the processor 310 further determines whether a corresponding adjacent finger is touching the second sub-sensor group of the said one finger. Specifically, the processor 210 or the processor 310 identifies the first feature value and the second feature value corresponding to the adjacent finger, and in response to determining that the first feature value is larger than the further grip threshold and the second feature value is not larger than the grip threshold, the processor 210 or the processor 310 determines that the adjacent finger is touching the second sub-sensor group of the said one finger and the adjacent finger is in the grip status (has maximum bending angle). It should be noted that the grip threshold may be different to the further grip threshold, and the grip threshold and the further grip threshold may be predetermined by the obtained second feature value upper limit and the obtained first feature value upper limit (the method for obtaining the second feature value upper limit and the first feature value upper limit of the sub-sensor groups of a sensor is similar to the method of determining the feature value upper limit of the sensor group).

Figure 11:
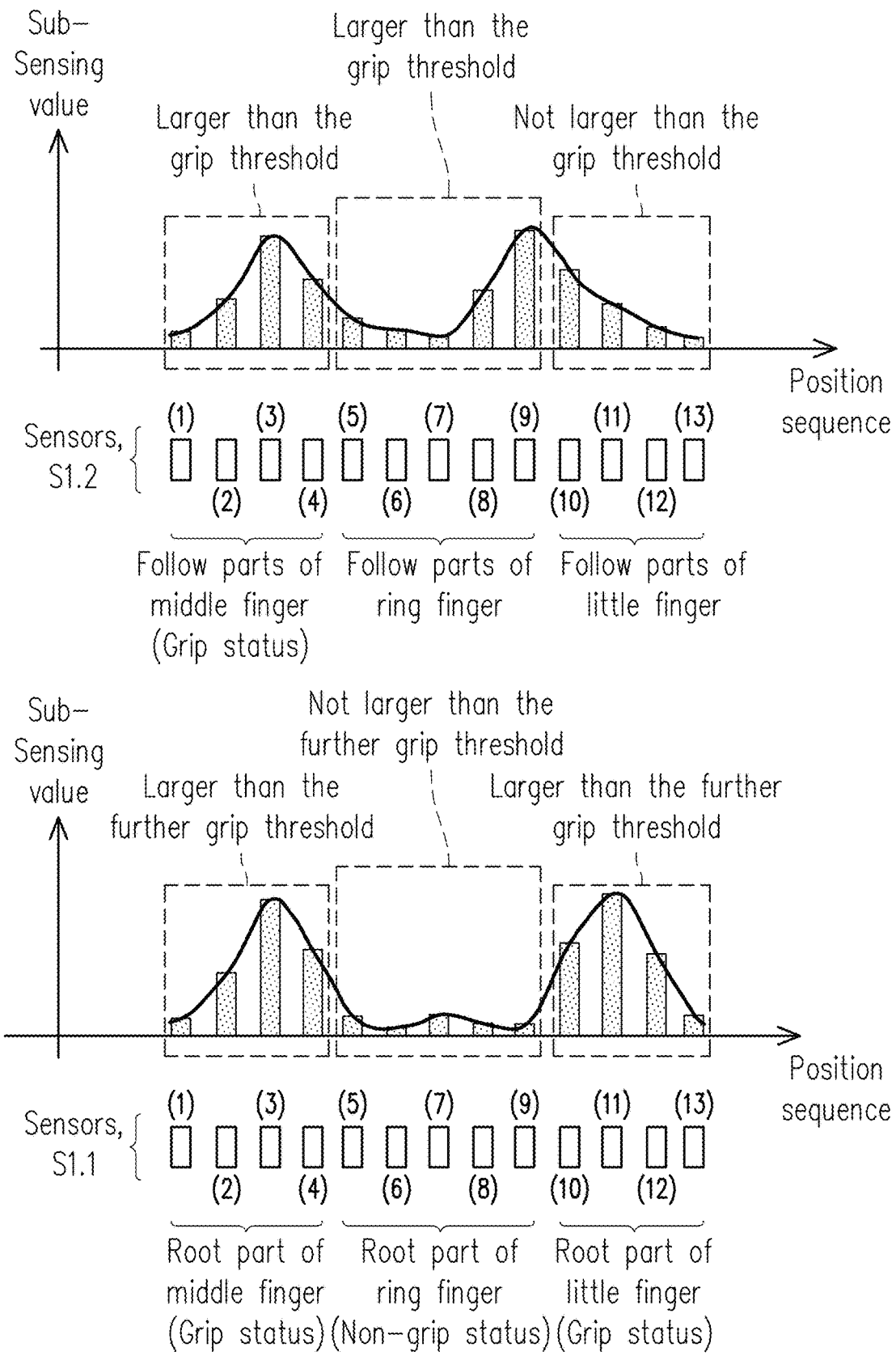
FIG. 11 is a schematic diagram of determining a Non-grip status or a Grip status of each of fingers by obtained feature values corresponding to different parts of the fingers according to a further embodiment of the invention.

FIG. 11 is a schematic diagram of determining a Non-grip status or a Grip status of each of fingers by obtained feature values corresponding to different parts of the fingers according to a further embodiment of the invention. Referring to FIG. 11 and FIG. 2C, for example, it is assumed that first sub-sensors (the first effective sub-sensors) S1.1(1) to S1.1(4) grouped in the first sub-sensor group corresponding to the root part of the middle finger; first sub-sensors S1.1(5) to S1.1(9) grouped in the first sub-sensor group corresponding to the root part of the ring finger; first sub-sensors S1.1(10) to S1.1(13) grouped in the first sub-sensor group corresponding to the root part of the little finger; second sub-sensors S1.2(1) to S1.2(4) grouped in the second sub-sensor group corresponding to the follow parts of the middle finger; second sub-sensors S1.2(5) to S1.2(9) grouped in the second sub-sensor group corresponding to the follow parts of the ring finger; second sub-sensors S1.2(10) to S1.2(13) grouped in the second sub-sensor group corresponding to the follow parts of the little finger. Furthermore, the processor 210 or the processor 310 identifies: the second feature value corresponding to the follow parts of the middle finger is larger than the grip threshold; the second feature value corresponding to the follow parts of the ring finger is larger than the grip threshold; the second feature value corresponding to the follow parts of the little finger is not larger than the grip threshold; the first feature value corresponding to the root part of the middle finger is larger than the further grip threshold; the first feature value corresponding to the root part of the ring finger is "not" larger than the further grip threshold; the first feature value corresponding to the root part of the little finger is larger than the further grip threshold.

In this example, regarding to the middle finger, in response to determining that the second feature value corresponding to the follow parts of middle finger is larger than the grip threshold (the follow parts of the middle finger is determined as in the grip status), and the first feature value corresponding to the root part of the middle finger is larger than the further grip threshold (the root part of the middle finger is determined as in the grip status), the processor 210 or the processor 310 may confirm that the middle finger is in the grip status since the whole parts of the fingers are in the grip status.

Furthermore, regarding to the ring finger, in response to determining that the second feature value corresponding to the follow parts of ring finger is larger than the grip threshold (the follow parts of the ring finger is determined as in the grip status), and the first feature value corresponding to the root part of the ring finger is NOT larger than the further grip threshold (the root part of the ring finger is determined as not in the grip status), the processor 210 or the processor 310 may confirm that the ring finger is not in the grip status since the whole parts of the fingers are not all in the grip status. Moreover, the processor 210 or the processor 310 may determine that second sub-sensor group of the ring finger is touched by the litter finger (which is the adjacent finger of the ring finger), and further determine that the little finger is in the grip status although the second feature value corresponding to the follow parts of the little finger is not larger than the grip threshold.

In the embodiment, the processor 210 or the processor 310 may identifies the grip strength of a finger in the grip status according to the sensing values of the sensors in the sensor group corresponding to the finger without detecting the pressure applied by the finger via one or more pressure sensors.

Specifically, the processor 210 or the processor 310 may generate a value-to-pressure mapping table. The value-to-pressure mapping table may be maintained in the memory 220 (or memory 320), and be stored into the storage circuit unit 230 or the storage circuit unit 330. Then, the processor 210 or the processor 310 may identifies a target pressure value being mapped by the feature value of a finger according to the value-to-pressure mapping table, and the target pressure value is identified as the grip strength (or the pressure) applied by the finger.

Referring to FIG. 6B, the value-to-pressure mapping table T620 includes a plurality of entries, and each of the entries has two fields of information. First fields of the entries record the predetermined feature values 510(Y)-510(Z), and second fields of the entries record the corresponding predetermined pressure values 530(Y)-530(Z) mapping to the predetermined feature values 510(Y)-510(Z). For example, in responding to determining that the feature value of one sensor group corresponding to a finger is matching to the predetermined feature value 510(Y+1), the processor 210 or the processor 310 may determining that the predetermined pressure values 530(Y+1) is the pressure value of the finger corresponding to the said one sensor group. The pressure value 530(Y+1) represents the grip strength (or the pressure) applied by the finger. It should be noted that the predetermined feature value 510(Y) is the smallest one among the predetermined feature values 510(Y)-510(Z), and the predetermined pressure value 530(Y) is the smallest one among the predetermined pressure values 530(Y)-530(Z). Furthermore, the predetermined feature value 510(Y) is the feature value upper limit corresponding to the sensor group related to the value-to-pressure mapping table.

In another embodiment, the processor 210 or the processor 310 may identifies the pressure value of a finger in the grip status via the generated pulse waveform.

Specifically, the processor 210 or the processor 310 may further identifies a plurality of predetermined pressure values respectively corresponding to the predetermined pulse waveforms. Then, the processor 210 or the processor 310 may identify, among the predetermined pressure values, a target predetermined pressure value corresponding to the target predetermined pulse waveform as the pressure value of the said one finger.

Furthermore, the processor 210 or the processor 310 may directly determine the pressure value of one finger according to the obtained sensing values corresponding to the finger.

In an embodiment, the processor 210 or the processor 310 determines a pressure value corresponding to one finger according to a difference between the second sub-sensing values of the sub-sensors corresponding to the said one finger and the grip threshold. The value of the difference may be converted into a pressure value by the processor 210 or the processor 310 according to a converting mode predetermined by experiment.

Figure 12A:
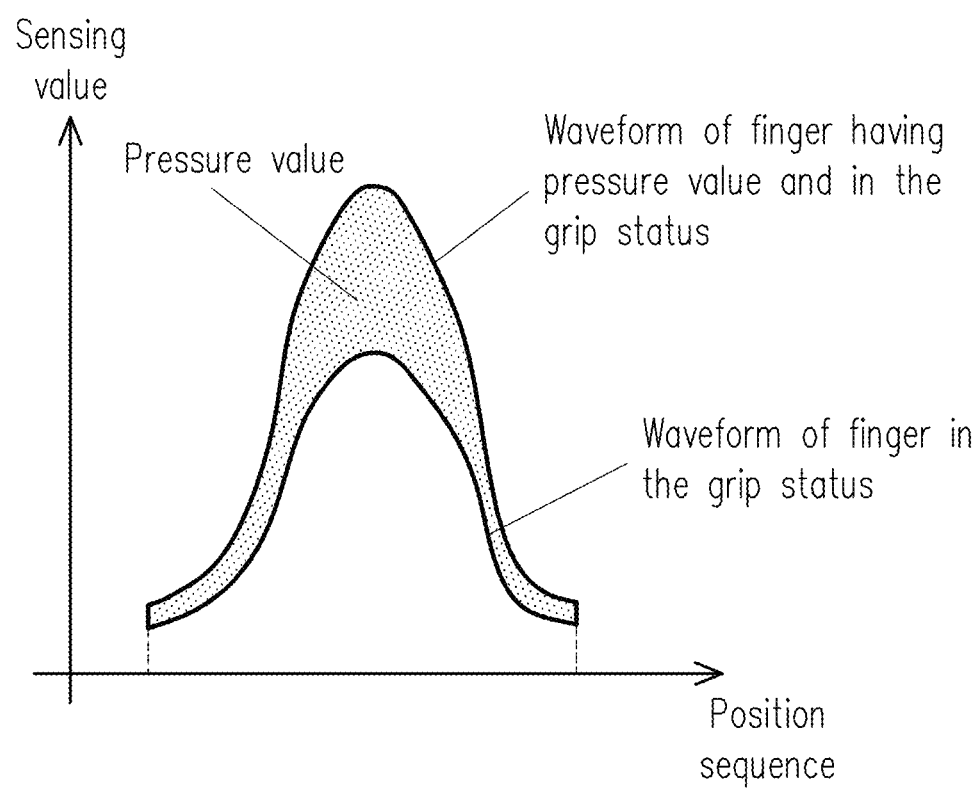
FIG. 12A is a schematic diagram illustrating obtaining a pressure value by the waveforms according to an embodiment of the invention.

FIG. 12A is a schematic diagram illustrating obtaining a pressure value by the waveforms according to an embodiment of the invention. Referring to FIG. 12A, in another embodiment, in response to obtaining a feature value of one sensor group not smaller than the feature value upper limit (corresponding to a grip threshold) corresponding to the said one sensor group, the processor 210 or the processor 310 determines a pressure value corresponding to the said one finger according to the feature value and the feature value upper limit. For example, as illustrated by FIG. 12A, the processor 210 or the processor 310 may identify a waveform (the waveform of finger in the grip status) corresponding to a feature value upper limit of one sensor group corresponding to one finger, and generate another waveform by the feature value not smaller than the feature value upper limit. The processor 210 or the processor 310 may identify the area between the waveform and another waveform (as the grey area illustrated in FIG. 12A between the waveforms), and the area represents the difference value between the feature value and the feature value upper limit.

In a further embodiment, each of the sensor groups comprises one or more base sensors, and a plurality of wing sensors. Furthermore, the sensing values of the one or more base sensors of one sensor group are used to determine a bending angle of a finger corresponding to the said one sensor group, and the sensing values of the wing sensors are used to determine a pressure value of the finger corresponding to the said one sensor group.

Figure 12B:
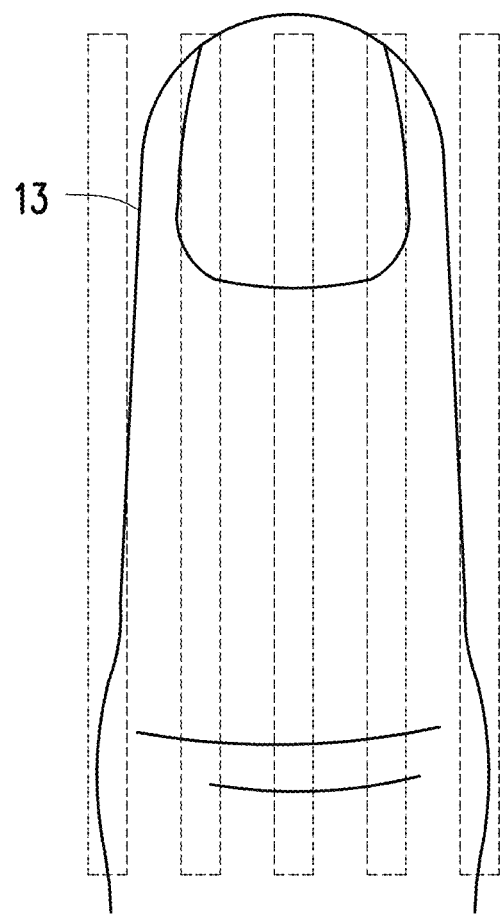
FIG. 12B is a schematic diagram illustrating a plurality of sensors disposed on the surface of the controller covered by a finger according to an embodiment of the invention.

FIG. 12B is a schematic diagram illustrating a plurality of sensors disposed on the surface of the controller covered by a finger according to an embodiment of the invention. Referring to FIG. 12B, it is assumed that the middle finger 13 are determined as covering on the sensor S1(1) to S1(5) (e.g., sensors S1(1) to S1(5) is grouped into the sensor group corresponding to the middle finger 13). In an embodiment, the processor 210 or the processor 310 may directly select/identify, according to the position order of the sensors, the middle one or more sensors among the sensors of the sensor group as the one or more base sensors, and the remaining sensors is identified as the wing sensors of the sensor group. For example, the sensor S1(3) is selected as the base sensor, and sensors S1(1), S1(2), S1(4) and S1(5) are wing sensors of the sensor group. For another example, the sensor S1(2) to S1(4) are selected as the base sensors, and sensors S1(1) and S1(5) are wing sensors of the sensor group.

In a further embodiment, the total of the sensing values of the base sensors are larger than the total of the sensing values of the wing sensors. Each of the sensing values of the base sensors should be larger than a base sensor threshold, and each of the sensing values of the wing sensors should not be larger than a base sensor threshold. Thus, the processor 210 or the processor 310 may select the base sensors according to the forgoing condition.

Figure 12C:
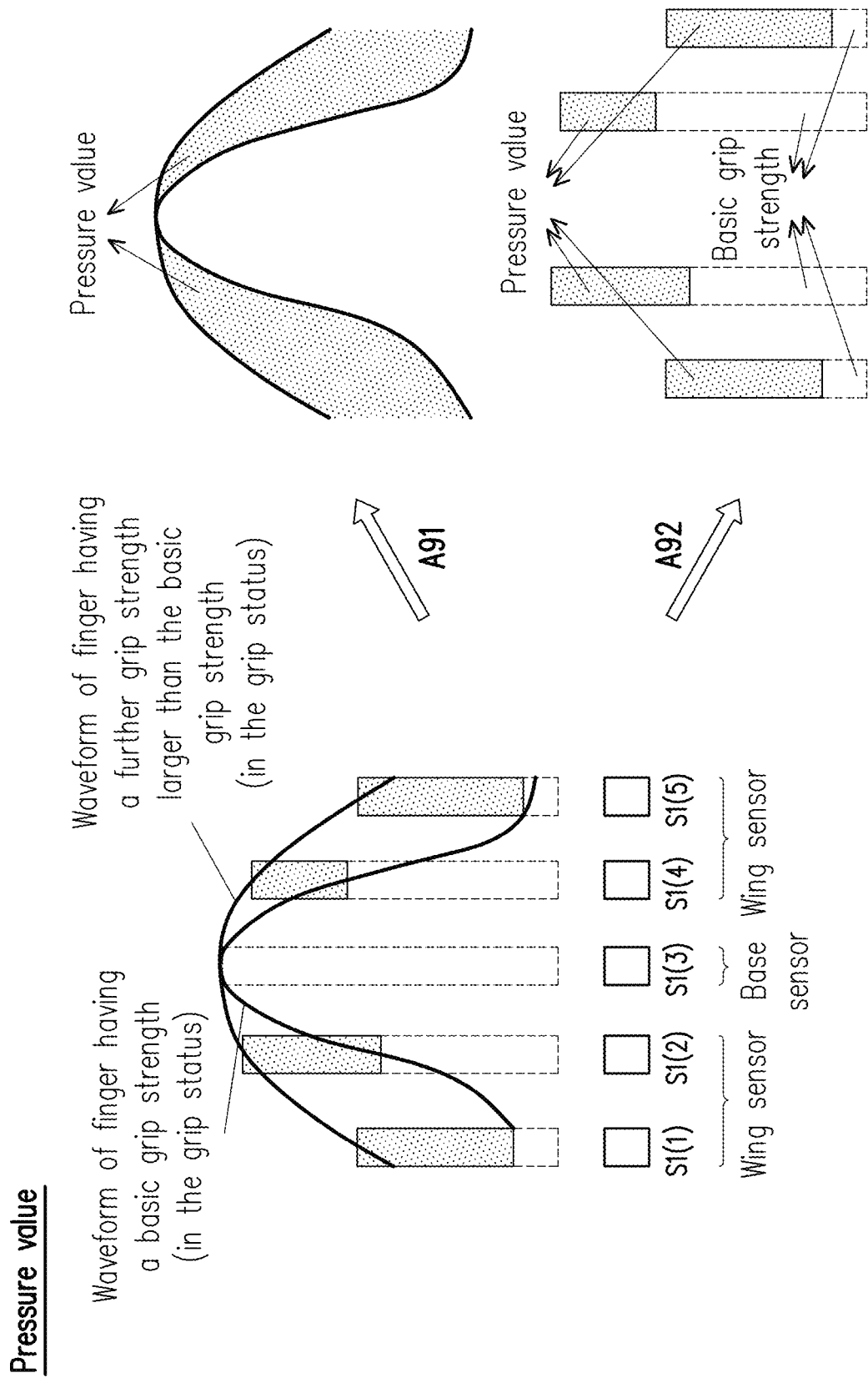
FIG. 12C is a schematic diagram illustrating a pressure value by wing sensors in a sensor group according to an embodiment of the invention.

FIG. 12C is a schematic diagram illustrating a pressure value by wing sensors in a sensor group according to an embodiment of the invention. Referring to FIG. 12C, it is assumed that the sensor group of one finger has base sensor S1(3) and wing sensors S1(1), S1(2), S1(4) and S1(5). The smaller waveform generated by the processor 210 or the processor 310 represent that the finger corresponding to the sensors S1(1) to S1(5) is in a grip status and applies a basic grip strength. Furthermore, the bigger waveform generated by the processor 210 or the processor 310 represent that the finger corresponding to the sensors S1(1) to S1(5) is in a grip status and applies a higher grip strength. As illustrated by arrow A91, the difference between two waveforms may be converted as the pressure value of the finger under the bigger waveform.

Moreover, as illustrated by arrow A92, the whole sensing values of the wing sensors S1(1), S1(2), S1(4) and S1(5) may represent (or be converted to) the basic grip strength of the finger. In other words, although two waveforms both represent the finger is in the grip status (the sensing value of the base sensor is larger than a grip threshold), the strength of the griping of the finger may be distinguished by the sensing values generated by the wing sensors S1(1), S1(2), S1(4) and S1(5) under different pressure applied by the finger.

Based on the foregoing embodiment, the provided electronic system (or a wearable electronic system), controller and computer-implement operating method for the same are capable of generating a plurality of sensing data by a plurality of sensor groups corresponding to a plurality of fingers disposed on surfaces of the controller of the electronic system (or a wearable electronic system), obtaining bending angles of the fingers according to the sensing data, rendering a plurality of virtual fingers corresponding to the fingers into a virtual space corresponding to the electronic system (or a wearable electronic system), and bending the virtual fingers according to the corresponding bending angles, so as to accurately render a virtual hand having a gesture matching to a gesture of the hand sensed by the controller. Therefore, the interaction ability of the electronic system (or a wearable electronic system) is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic system, comprising:
   a controller, comprising a sensing device and a first communication circuit unit, wherein the controller is operated by a hand of the user,
      wherein the sensing device comprises a plurality of sensors disposed on one or more surfaces of the controller; and
   an electronic device, comprising a processor, a display device and a second communication circuit unit,
      wherein a connection is established by the first communication circuit unit and the second communication circuit unit, and the established connection is used for transmitting data between the controller and the electronic device,
   wherein each of the sensors is configured to generate sensing data by determining a triggered area of each of the sensors, wherein the triggered area is an area, covered by a finger of a plurality of fingers of the hand, of a surface on which each of the sensors disposed, wherein the plurality of sensing data corresponding to the sensors are transmitted to the electronic device via the connection,
   wherein the processor is configured to identify a plurality of effective sensors among the sensors according to the generated sensing data of the sensors,
   wherein the processor is further configured to dynamically group the effective sensors into a plurality of sensor groups and determine a sensor group corresponds to each finger of the plurality of fingers of the hand respectively,
   wherein the processor is further configured to obtain a bending angle of one finger among the fingers according to sensing values of the sensing data of all effective sensors in one sensor group corresponding to the said one finger among the sensor groups,
   wherein the processor is further configured to instruct the display device to render a virtual hand having a plurality of virtual fingers corresponding to the fingers into a virtual space corresponding to the electronic device,
   wherein the processor is further configured to determine to calculate a bending amount of one virtual finger corresponding to the said one finger among the virtual fingers according to the obtained bending angle of the said one finger, so as to render the virtual hand having a gesture matching to a gesture of the hand sensed by the sensing device.

2. The electronic system according to claim 1, wherein the sensing value of the sensing data generated by one sensor is proportional to the size of the triggered area corresponding to the said one sensor.

3. The electronic system according to claim 1, wherein in the operation of obtaining the bending angle of the said one finger among the fingers according to the sensing values of the sensing data of all effective sensors in the said one sensor group corresponding to the said one finger among the sensor groups, the processor calculates a summation of the sensing values of the sensing data of all effective sensors in the said one sensor group as a feature value of the said one sensor group,
   wherein the processor identifies a feature value upper limit and a feature value lower limit corresponding to the said one sensor group, a bending angle upper limit and a bending angle lower limit corresponding to the said one finger,
   wherein the processor converts the bending angle of the said one finger according to the feature value, the feature value upper limit, the feature value lower limit, the bending angle upper limit and the bending angle lower limit.

4. The electronic system according to claim 1, wherein the processor periodically obtains a plurality of feature values of one sensor group corresponding to one finger during a specific duration, wherein each of the feature values is obtained according to the sensing values of all effective sensors of the said one sensor group each time generated during the specific duration,
   wherein the processor identifies, during the specific duration, one or more grip feature values which are recorded while the said one finger is determined as being in a grip status among the feature values, and the processor calculates an average value of the one or more grip feature values as a feature value upper limit corresponding to the said one sensor group,
   wherein the processor selects a minimum feature values among the feature values during the specific duration as a feature value lower limit corresponding to the said one sensor group,
   wherein, during the specific duration, the user is instructed by the electronic system to use different gestures of the hand.

5. The electronic system according to claim 1, wherein each of the sensors comprises a plurality of sub-sensors,
   wherein the sensing value of each of the sensors is generated by a first sub-sensing value provided by a first sub-sensor among the sub-sensors and one or more second sub-sensing values provided by one or more second sub-sensors among the sub-sensors according to a first weight value corresponding to the first sub-sensor and one or more second weight values corresponding to the one or more second sub-sensors, wherein the first sub-sensors of the sensors are corresponding to the root parts of the fingers, and the second sub-sensors are corresponding to the follow parts of the fingers, wherein the processor calculates a first feature value corresponding to one first sub-sensor group corresponding to the root part of one finger according to the first sub-sensing values of the first sub-sensors in the said one first sub-sensor group, and calculates a second feature value corresponding to one second sub-sensor group corresponding to the follow parts of the said one finger according to the second sub-sensing values of the second sub-sensors in the said one second sub-sensor group, wherein in response to determining that the calculated second feature value is larger than a grip threshold, the processor determines whether the calculated first feature value is larger than a further grip threshold, wherein in response to determining that the calculated first feature value is larger than a further grip threshold, the processor determines that the said one finger has a maximum bending angle or the said one finger is in a grip status.

6. The electronic system according to claim 1, wherein the processor identifies one adjacent finger corresponding to the said one finger and obtains a further feature value corresponding to the said one adjacent finger, wherein the said one adjacent finger is disposed next to the said one finger on the same surface, wherein in response to determining that the further feature value is larger than an adjusting threshold, the processor adjusts a target sensing value generated by a target effective sensor among the effective sensors in the said one sensor group corresponding to the said one finger, so as to adjust the obtained feature value corresponding to the said one finger.

7. The electronic system according to claim 1, wherein in the operation of dynamically grouping the effective sensors into the plurality of sensor groups and determining the sensor group corresponds to each finger of the plurality of fingers of the hand respectively, the processor identifies a plurality of first effective sensors disposed on a first surface of the controller among the effective sensors, and a plurality of second effective sensors disposed on a second surface of the controller among the effective sensors, wherein the first surface is predetermined as one surface to be touched by a plurality of first fingers among the fingers, and the second surface is predetermined as one further surface to be touched by only a second finger among the fingers, wherein the processor directly groups the second effective sensors into a second sensor group corresponding to the second finger, and groups the first effective sensors into a plurality of first sensor groups respectively corresponding to the first fingers according to the amount of the first fingers and a position order of the first effective sensors, wherein the amount of the first fingers is equal to the amount of the first sensor groups.

8. The electronic system according to claim 7, the processor initially selects front P first effective sensors among the first effective sensors, and groups the front P first effective sensors into a front first sensor group corresponding to a front first finger according to the position order among the first sensor group, wherein the processor initially selects the back P first effective sensors among the first effective sensors, and groups the back P first effective sensors into a back first sensor group corresponding to a back first finger according to the position order among the first sensor group, wherein P is determined by dividing the amount of the first effective sensors with the amount of the first fingers, wherein in response to one or more remaining first sensors among the first sensor groups not being grouped, the processor initially groups the remaining first effective sensors among the first effective sensors into the one or more remaining first sensor group, wherein the processor performs a sensor grouping calibration in the background to periodically re-identify the effective sensors and re-group the first effective sensors among the re-identified effective sensors into the first sensor groups according to the sensing values of the first effective sensors.

9. The electronic system according to claim 1, wherein each of the virtual fingers has one root part connecting to a virtual palm of the virtual hand and one or more follow parts connecting to the root part, wherein the virtual palm, the root parts and the follow parts of the virtual fingers respectively corresponds to a palm of the hand, root parts and follow parts of the fingers, in the operation of bending the said one virtual finger corresponding to the said one finger among the virtual fingers according to the obtained bending angle of the said one finger, the processor bends the root part of the said one virtual finger by the obtained bending angle, wherein the processor bends the one or more follow parts according to one or more follow bending angles corresponding to the one or more follow parts.

10. The electronic system according to claim 9, wherein each of the sensors comprises a plurality of sub-sensors, wherein the sensing value of each of the sensors is generated by a first sub-sensing value provided by a first sub-sensor among the sub-sensors and one or more second sub-sensing values provided by one or more second sub-sensors among the sub-sensors, wherein the first sub-sensors of the sensors are corresponding to the root parts of the fingers, and the second sub-sensors are corresponding to the follow parts of the fingers.

11. A controller, connected to an electronic device, wherein the controller is operated by a user, comprising:

a sensing device;

a first communication circuit unit, wherein a connection is established by the first communication circuit unit and a second communication circuit unit of the electronic device, and the established connection is used for transmitting data between the controller and the electronic device; and a processor, wherein the sensing device comprises a plurality of sensors disposed on one or more surfaces of the controller, wherein each of the sensors is configured to generate sensing data by determining a triggered area of each of the sensors, wherein the triggered area is an area, covered by a finger of a plurality of fingers of a hand, of a surface on which each of the sensors disposed, wherein the plurality of sensing data corresponding to the sensors are transmitted to the electronic device via the connection, wherein the processor is configured to identify a plurality of effective sensors among the sensors according to the generated sensing data of the sensors, wherein the processor is further configured to dynamically group the effective sensors into a plurality of sensor groups and determine a sensor group corresponds to each finger of the plurality of fingers of the hand respectively, wherein the processor is further configured to obtain a bending angle of one finger among the fingers according to sensing values of the sensing data of all effective sensors in one sensor group corresponding to the said one finger among the sensor groups, wherein the bending angle of the said one finger is transmitted to a further processor of the electronic device via the connection, wherein the further processor is configured to instruct a display device of the electronic device to render a virtual hand having a plurality of virtual fingers corresponding to the fingers into a virtual space corresponding to the electronic device, wherein the further processor is further configured to determine to calculate a bending amount of one virtual finger corresponding to the said one finger among the virtual fingers according to the obtained bending angle of the said one finger, so as to render the virtual hand having a gesture matching to a gesture of the hand sensed by the sensing device.

12. The controller according to claim 11, wherein the sensing value of the sensing data generated by one sensor is proportional to the size of the triggered area corresponding to the said one sensor.

13. The controller according to claim 11, wherein in the operation of obtaining the bending angle of the said one finger among the fingers according to the sensing values of the sensing data of all effective sensors in the said one sensor group corresponding to the said one finger among the sensor groups, the processor calculates a summation of the sensing values of the sensing data of all effective sensors in the said one sensor group as a feature value of the said one sensor group, wherein the processor identifies a feature value upper limit and a feature value lower limit corresponding to the said one sensor group, a bending angle upper limit and a bending angle lower limit corresponding to the said one finger, wherein the processor converts the bending angle of the said one finger according to the feature value, the feature value upper limit, the feature value lower limit, the bending angle upper limit and the bending angle lower limit.

14. The controller according to claim 11, wherein the processor periodically obtains a plurality of feature values of one sensor group corresponding to one finger during a specific duration, wherein each of the feature values is obtained according to the sensing values of all effective sensors of the said one sensor group each time generated during the specific duration, wherein the processor identifies, during the specific duration, one or more grip feature values which are recorded while the said one finger is determined as being in a grip status among the feature values, and the processor calculates an average value of the one or more grip feature values as a feature value upper limit corresponding to the said one sensor group, wherein the processor selects a minimum feature values among the feature values during the specific duration as a feature value lower limit corresponding to the said one sensor group, wherein, during the specific duration, the user is instructed by the electronic system to use different gestures of the hand.

15. The controller according to claim 11, wherein each of the sensors comprises a plurality of sub-sensors, wherein the sensing value of each of the sensors is generated by a first sub-sensing value provided by a first sub-sensor among the sub-sensors and one or more second sub-sensing values provided by one or more second sub-sensors among the sub-sensors according to a first weight value corresponding to the first sub-sensor and one or more second weight values corresponding to the one or more second sub-sensors, wherein the first sub-sensors of the sensors are corresponding to the root parts of the fingers, and the second sub-sensors are corresponding to the follow parts of the fingers, wherein the processor calculates a first feature value corresponding to one first sub-sensor group corresponding to the root part of one finger according to the first sub-sensing values of the first sub-sensors in the said one first sub-sensor group, and calculates a second feature value corresponding to one second sub-sensor group corresponding to the follow parts of the said one finger according to the second sub-sensing values of the second sub-sensors in the said one second sub-sensor group, wherein in response to determining that the calculated second feature value is larger than a grip threshold, the processor determines whether the calculated first feature value is larger than a further grip threshold, wherein in response to determining that the calculated first feature value is larger than a further grip threshold, the processor determines that the said one finger has a maximum bending angle or the said one finger is in a grip status.

16. The controller according to claim 11, wherein the processor identifies one adjacent finger corresponding to the said one finger and obtains a further feature value corresponding to the said one adjacent finger, wherein the said one adjacent finger is disposed next to the said one finger on the same surface, wherein in response to determining that the further feature value is larger than an adjusting threshold, the processor adjusts a target sensing value generated by a target effective sensor among the effective sensors in the said one sensor group corresponding to the said one finger, so as to adjust the obtained feature value corresponding to the said one finger.

17. The controller according to claim 11, wherein in the operation of dynamically grouping the effective sensors into the plurality of sensor groups and determining the sensor group corresponds to each finger of the plurality of fingers of the hand respectively, the processor identifies a plurality of first effective sensors disposed on a first surface of the controller among the effective sensors, and a plurality of second effective sensors disposed on a second surface of the controller among the effective sensors, wherein the first surface is predetermined as one surface to be touched by a plurality of first fingers among the fingers, and the second surface is predetermined as one further surface to be touched by only a second finger among the fingers, wherein the processor directly groups the second effective sensors into a second sensor group corresponding to the second finger, and groups the first effective sensors into a plurality of first sensor groups respectively corresponding to the first fingers according to the amount of the first fingers and a position order of the first effective sensors, wherein the amount of the first fingers is equal to the amount of the first sensor groups.

18. The controller according to claim 17, the processor initially selects front P first effective sensors among the first effective sensors, and groups the front P first effective sensors into a front first sensor group corresponding to a front first finger according to the position order among the first sensor group, wherein the processor initially selects the back P first effective sensors among the first effective sensors, and groups the back P first effective sensors into a back first sensor group corresponding to a back first finger according to the position order among the first sensor group, wherein P is determined by dividing the amount of the first effective sensors with the amount of the first fingers, wherein in response to one or more remaining first sensors groups among the first sensor groups not being grouped, the processor initially groups the remaining first effective sensors among the first effective sensors into the one or more remaining first sensor group, wherein the processor performs a sensor grouping calibration in the background to periodically re-identify the effective sensors and re-group the first effective sensors among the re-identified effective sensors into the first sensor groups according to the sensing values of the first effective sensors.

19. The controller according to claim 11, wherein each of the virtual fingers has one root part connecting to a virtual palm of the virtual hand and one or more follow parts connecting to the root part, wherein the virtual palm, the root parts and the follow parts of the virtual fingers respectively corresponds to a palm of the hand, root parts and follow parts of the fingers, in the operation of bending the said one virtual finger corresponding to the said one finger among the virtual fingers according to the obtained bending angle of the said one finger, the further processor bends the root part of the said one virtual finger by the obtained bending angle, wherein the further processor bends the one or more follow parts according to one or more follow bending angles corresponding to the one or more follow parts.

20. The controller according to claim 19, wherein each of the sensors comprises a plurality of sub-sensors, wherein the sensing value of each of the sensors is generated by a first sub-sensing value provided by a first sub-sensor among the sub-sensors and one or more second sub-sensing values provided by one or more second sub-sensors among the sub-sensors, wherein the first sub-sensors of the sensors are corresponding to the root parts of the fingers, and the second sub-sensors are corresponding to the follow parts of the fingers.

* * * * *